US 12,066,670 B2

(12) United States Patent
Cui et al.

(10) Patent No.: US 12,066,670 B2
(45) Date of Patent: Aug. 20, 2024

(54) OPTICAL MODULE

(71) Applicant: Hisense Broadband Multimedia Technologies Co., Ltd., Shandong (CN)

(72) Inventors: Wei Cui, Shandong (CN); Xuxia Liu, Shandong (CN); Baofeng Si, Shandong (CN); Xiaolei Ma, Shandong (CN); Sigeng Yang, Shandong (CN)

(73) Assignee: HISENSE BROADBAND MULTIMEDIA TECHNOLOGIES CO., LTD., Shandong (CN)

( * ) Notice: Subject to any disclaimer, the term of this patent is extended or adjusted under 35 U.S.C. 154(b) by 272 days.

(21) Appl. No.: 17/547,770

(22) Filed: Dec. 10, 2021

(65) Prior Publication Data

US 2022/0099902 A1 Mar. 31, 2022

Related U.S. Application Data

(63) Continuation-in-part of application No. PCT/CN2021/098264, filed on Jun. 4, 2021.

(30) Foreign Application Priority Data

Aug. 18, 2020 (CN) .......................... 202010833918.X
Aug. 25, 2020 (CN) .......................... 202021793499.3

(51) Int. Cl.
*G02B 6/42* (2006.01)
(52) U.S. Cl.
CPC ........... *G02B 6/426* (2013.01); *G02B 6/4206* (2013.01); *G02B 6/428* (2013.01)
(58) Field of Classification Search
CPC ........ G02B 6/42; G02B 6/426; G02B 6/4206; G02B 6/428
See application file for complete search history.

(56) References Cited

U.S. PATENT DOCUMENTS

2014/0233896 A1 8/2014 Ishigami et al.
2016/0306122 A1 10/2016 Tong et al.
(Continued)

FOREIGN PATENT DOCUMENTS

CN 103713362 A 4/2014
CN 103995322 A 8/2014
(Continued)

OTHER PUBLICATIONS

International Search Report and Written Opinion issued in corresponding International Application No. PCT/CN2021/098264 dated Sep. 29, 2021.

(Continued)

*Primary Examiner* — Tina M Wong
(74) *Attorney, Agent, or Firm* — Morgan, Lewis & Bockius LLP

(57) ABSTRACT

An optical module includes a shell, a circuit board, at least one of a light-transmitting chip or a light-receiving chip, a lens assembly, an optical fiber ferrule assembly and a fixing plate. The circuit board is disposed in the shell. The light-transmitting chip and/or the light-receiving chip is disposed on the circuit board. The lens assembly is disposed on the circuit board, covers the light-transmitting chip and/or the light-receiving chip, and is configured to change a propagation direction of an optical signal incident into the lens assembly. The optical fiber ferrule assembly is connected to the lens assembly, and is configured to transmit an optical signal incident into the optical fiber ferrule assembly. The fixing plate is configured to fix the optical fiber ferrule assembly to the lens assembly.

12 Claims, 12 Drawing Sheets

(56) References Cited

U.S. PATENT DOCUMENTS

| | | | |
|---|---|---|---|
| 2017/0363820 A1 | 12/2017 | Hino | |
| 2019/0310434 A1* | 10/2019 | Hikosaka | G02B 6/4245 |
| 2019/0346637 A1 | 11/2019 | Schwerzig et al. | |
| 2019/0391349 A1* | 12/2019 | Chen | G02B 6/4277 |
| 2020/0341219 A1* | 10/2020 | Zhou | G02B 6/426 |

FOREIGN PATENT DOCUMENTS

| | | | |
|---|---|---|---|
| CN | 105929492 A | 9/2016 | |
| CN | 107526137 A | 12/2017 | |
| CN | 108051893 A | 5/2018 | |
| CN | 207586483 U | 7/2018 | |
| CN | 210119608 U | 2/2020 | |
| CN | 111239930 A | 6/2020 | |
| CN | 111239934 A | 6/2020 | |
| CN | 212647091 U | 3/2021 | |

OTHER PUBLICATIONS

Office Action issued in corresponding Chinese Patent Application No. 202010833918.X dated Jun. 16, 2022, with English translation.
International Search Report and Written Opinion issued in corresponding International Application No. PCT/CN2021/098264 dated Sep. 9, 2021.

* cited by examiner

OPTICAL MODULE

CROSS-REFERENCE TO RELATED APPLICATIONS

This application is a continuation-in-part Application of International Application No. PCT/CN2021/098264 filed on Jun. 4, 2021, which claims priority to Chinese Patent Application No. 202010833918.X filed on Aug. 18, 2020, and Chinese Patent Application No. 202021793499.3 filed on Aug. 25, 2020, the entirety of each is incorporated herein by reference.

TECHNICAL FIELD

The present disclosure relates to the field of optical communication technologies, and in particular, to an optical module.

BACKGROUND

Optical communication technologies are used in new services and application modes such as cloud computing, mobile internet and video conferencing. In the optical communication, an optical module is a tool for achieving inter-conversion between an optical signal and an electrical signal, and is one of key elements in an optical communication device. The optical module generally includes an optical transmitting device and an optical receiving device. The optical transmitting device is configured to convert an electrical signal into an optical signal and transmitted the optical signal through the fiber, and the optical receiving device is configured to convert an optical signal transmitted by the fiber into an electrical signal.

SUMMARY

An optical module is provided. The optical module includes a shell, a circuit board, at least one of a light-transmitting chip or a light-receiving chip, a lens assembly, an optical fiber ferrule assembly and a fixing plate. The circuit board is disposed in the shell. The at least one of the light-transmitting chip or the light-receiving chip is disposed on the circuit board, the light-transmitting chip is configured to generate an optical signal, and the light-receiving chip is configured to receive an optical signal from an outside of the optical module. The lens assembly is disposed on the circuit board, covers the light-transmitting chip and/or the light-receiving chip, and is configured to change a propagation direction of an optical signal incident into the lens assembly. The optical fiber ferrule assembly is connected to the lens assembly, and is configured to transmit an optical signal incident into the optical fiber ferrule assembly. The fixing plate is configured to fix the optical fiber ferrule assembly to the lens assembly.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on an actual size of a product, an actual process of a method and an actual timing of a signal to which the embodiments of the present disclosure relate.

DETAILED DESCRIPTION

Figure 1A:
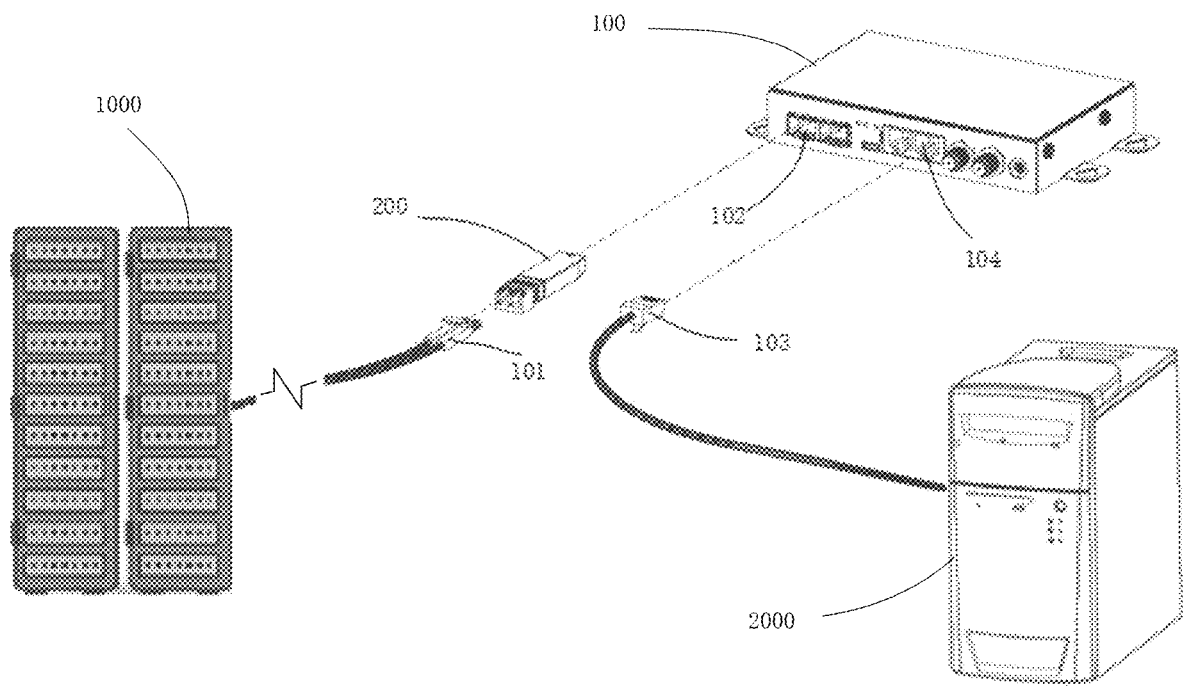
FIG. 1A is a connection relationship diagram of an optical communication system, in accordance with some embodiments.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to". In the description of the specification, the terms such as "one embodiment", "some embodiments", "exemplary embodiments", "example", "specific example" or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms "first" and "second" are used for descriptive purposes only, and are not to be construed as indicating or implying the relative importance or implicitly indicating the number of indicated technical features. Thus, features defined with "first" and "second" may explicitly or implicitly include one or more of the features. In the description of the embodiments of the present disclosure, the term "a/the plurality of" means two or more unless otherwise specified.

In the description of some embodiments, the term "coupled" and "connected" and their derivatives may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The use of the phrase "applicable to" or "configured to" herein means an open and inclusive language, which does not exclude devices that are applicable to or configured to perform additional tasks or steps.

As used herein, the term "about", "substantially" or "approximately" includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

In optical communication technology, an optical signal is used to carry information to be transmitted, and the optical signal carrying the information is transmitted to an information processing device such as a computer through an information transmission device such as an optical fiber or an optical waveguide, so as to achieve transmission of the information. Since light has a characteristic of passive transmission when being transmitted through the optical fiber or the optical waveguide, low-cost and low-loss information transmission may be achieved. In addition, a signal transmitted by the information transmission device such as the optical fiber or the optical waveguide is the optical signal, while a signal that may be recognized and processed by the information processing device such as the computer is an electrical signal. Therefore, in order to establish information connection between the information transmission device such as the optical fiber or the optical waveguide and the information processing device such as the computer, interconversion between the electrical signal and the optical signal needs to be achieved.

An optical module implements a function of the interconversion between the optical signal and the electrical signal in the field of optical fiber communication technology. The optical module includes an optical port and an electrical port. The optical module achieves optical communication with the information transmission device such as the optical fiber or the optical waveguide through the optical port. And the optical module achieves electrical connection with an optical network terminal (e.g., an optical modem) through the electrical port. The electrical connection is mainly to achieve power supply, transmission of an I2C signal, transmission of data information and grounding. The optical network terminal transmits the electrical signal to the information processing device such as the computer through a network cable or wireless fidelity (Wi-Fi).

Figure 1B:
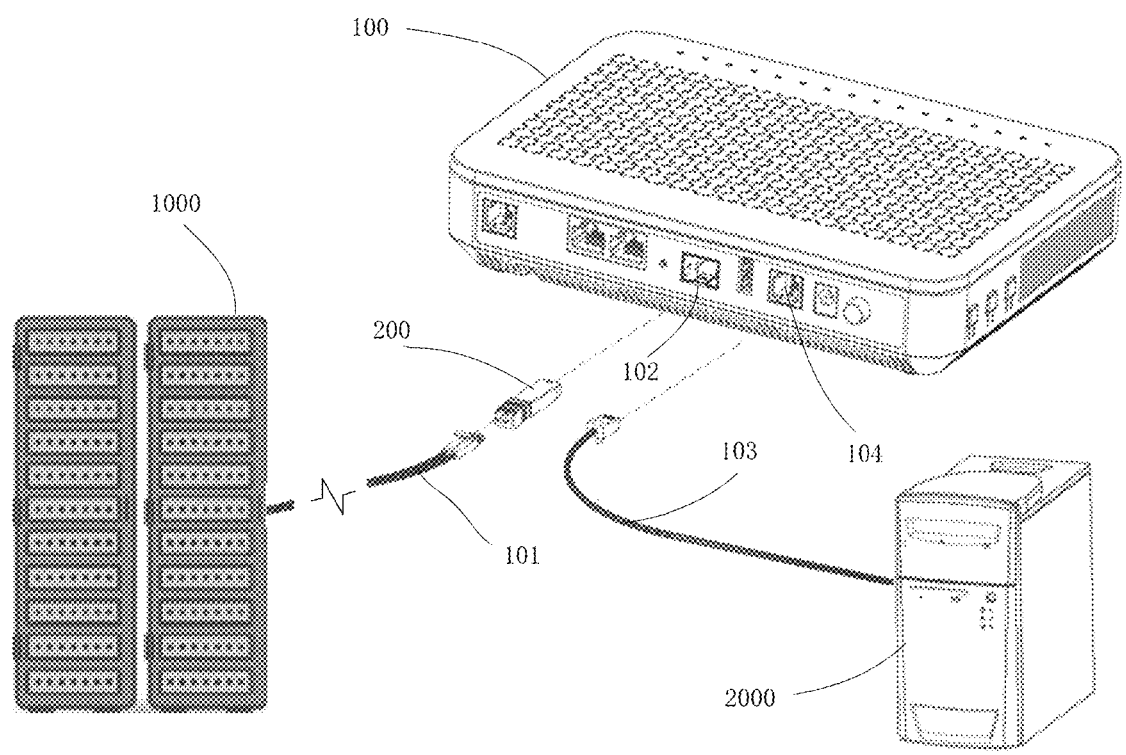
FIG. 1B is a connection relationship diagram of another optical communication system, in accordance with some embodiments.

FIG. 1A is a connection relationship diagram of an optical communication system, and FIG. 1B is a connection relationship diagram of another optical communication system. As shown in FIGS. 1A and 1B, the optical communication system includes a remote server 1000, a local information processing device 2000, an optical network terminal 100, an optical module 200, an optical fiber 101 and a network cable 103.

One end of the optical fiber 101 is connected to the remote server 1000, and the other end thereof is connected to the optical network terminal 100 through the optical module 200. The optical fiber itself may support long-distance signal transmission, such as several-kilometer (6-kilometer to 8-kilometer) signal transmission. On this basis, infinite-distance transmission may be achieved theoretically if a repeater is used. Therefore, in a typical optical communication system, a distance between the remote server 1000 and the optical network terminal 100 may typically reach several kilometers, tens of kilometers, or hundreds of kilometers.

One end of the network cable 103 is connected to the local information processing device 2000, and the other end thereof is connected to the optical network terminal 100. The local information processing device 2000 is at least one of the followings: a router, a switch, a computer, a mobile phone, a tablet computer or a television.

A physical distance between the remote server 1000 and the optical network terminal 100 is greater than a physical distance between the local information processing device 2000 and the optical network terminal 100. Connection between the local information processing device 2000 and the remote server 1000 is completely by the optical fiber 101 and the network cable 103, and connection between the optical fiber 101 and the network cable 103 is completely by the optical module 200 and the optical network terminal 100.

The optical module 200 includes an optical port and an electrical port. The optical port is configured to access the optical fiber 101, so that a bidirectional optical signal connection is established between the optical module 200 and the optical fiber 101; and the electrical port is configured to access the optical network terminal 100, so that a bidirectional electrical signal connection is established between the optical module 200 and the optical network terminal 100. Interconversion between the optical signal and the electrical signal is achieved by the optical module 200, so that information connection between the optical fiber 101 and the optical network terminal 100 is established. For example, an optical signal from the optical fiber 101 is converted into an electrical signal by the optical module 200 and then the electrical signal is input into the optical network terminal 100, and an electrical signal from the optical network terminal 100 is converted into an optical signal by the optical module 200 and then the optical signal is input into the optical fiber 101. Since the optical module 200 is a tool for achieving the interconversion between the optical signal and the electrical signal, and has no function of processing data, the information does not change in the above photoelectric conversion process.

The optical network terminal 100 includes a housing in a substantially cuboid shape, and an optical module interface 102 and a network cable interface 104 that are disposed on the housing. The optical module interface 102 is configured to access the optical module 200, so that the bidirectional electrical signal connection between the optical network terminal 100 and the optical module 200 is established; and the network cable interface 104 is configured to access the network cable 103, so that a bidirectional electrical signal connection between the optical network terminal 100 and the network cable 103 is established. Connection between the optical module 200 and the network cable 103 is established through the optical network terminal 100. For example, the optical network terminal 100 transmits an electrical signal from the optical module 200 to the network cable 103, and transmits an electrical signal from the network cable 103 to the optical module 200. Therefore, the optical network terminal 100, as a master monitor of the optical module 200, may monitor operation of the optical module 200. In addition to the optical network terminal 100, the master monitor of the optical module 200 may further include an optical line terminal (OLT).

A bidirectional signal transmission channel between the remote server 1000 and the local information processing device 2000 has been established through the optical fiber 101, the optical module 200, the optical network terminal 100 and the network cable 103.

Figure 2:
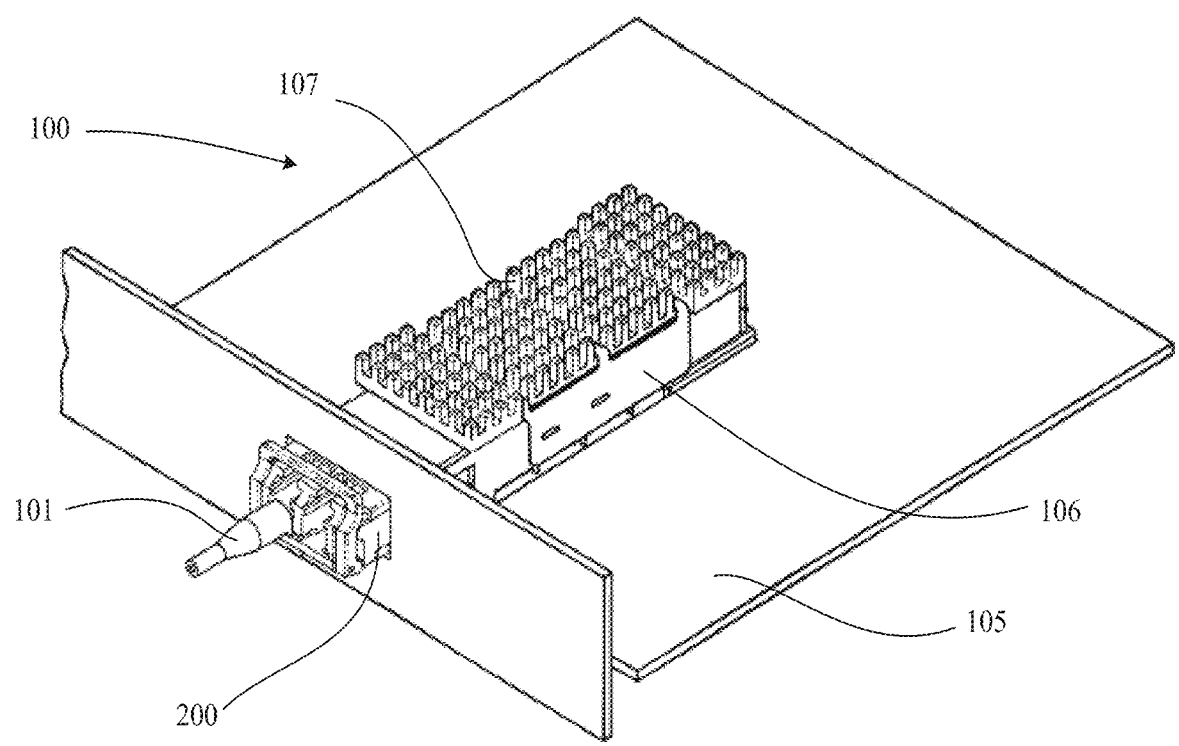
FIG. 2 is a structural diagram of an optical network terminal, in accordance with some embodiments.

FIG. 2 is a structural diagram of an optical network terminal. In order to clearly show a connection relationship between the optical module 200 and the optical network terminal 100, FIG. 2 only shows a structure of the optical network terminal 100 related to the optical module 200. As shown in FIG. 2, the optical network terminal 100 further includes a circuit board 105 disposed in the housing, a cage 106 disposed on a surface of the circuit board 105, a heat sink 107 disposed on the cage 106, and an electrical connector disposed inside the cage 106. The electrical connector is configured to access the electrical port of the optical module 200. The heat sink 107 has protruding portions such as fins for increasing a heat dissipation area.

The optical module 200 is inserted into the cage 106 of the optical network terminal 100, the optical module 200 is fixed by the cage 106, and heat generated by the optical module 200 is conducted to the cage 106 and is dissipated through the heat sink 107. After the optical module 200 is inserted into the cage 106, the electrical port of the optical module 200 is connected to the electrical connector inside the cage 106, so that the bidirectional electrical signal connection between the optical module 200 and the optical network terminal 100 is established. In addition, the optical port of the optical module is connected to the optical fiber 101, so that the bidirectional optical signal connection between the optical module 200 and the optical fiber 101 is established.

Figure 3:
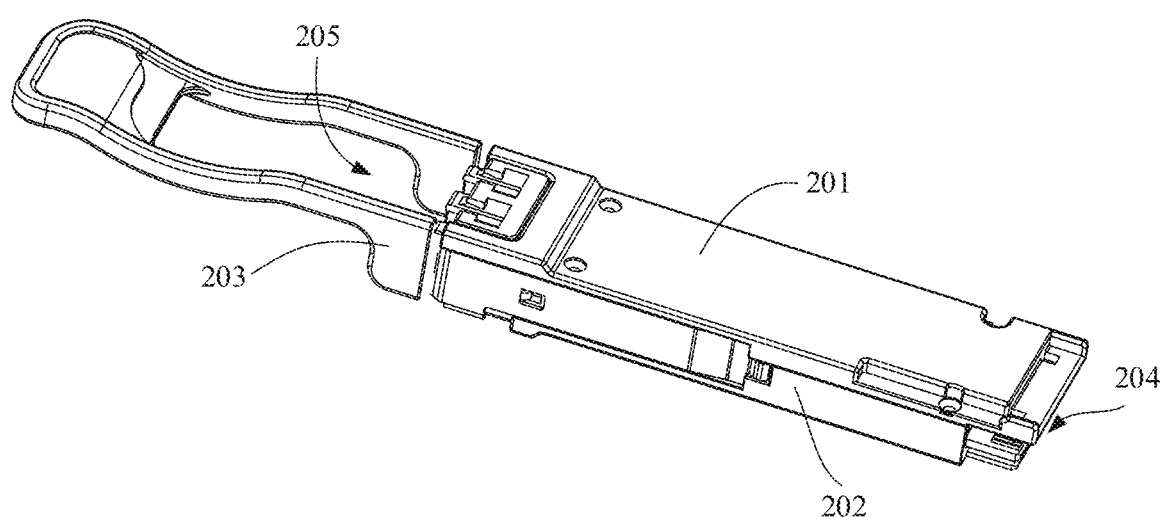
FIG. 3 is a structural diagram of an optical module, in accordance with some embodiments.
Figure 4:
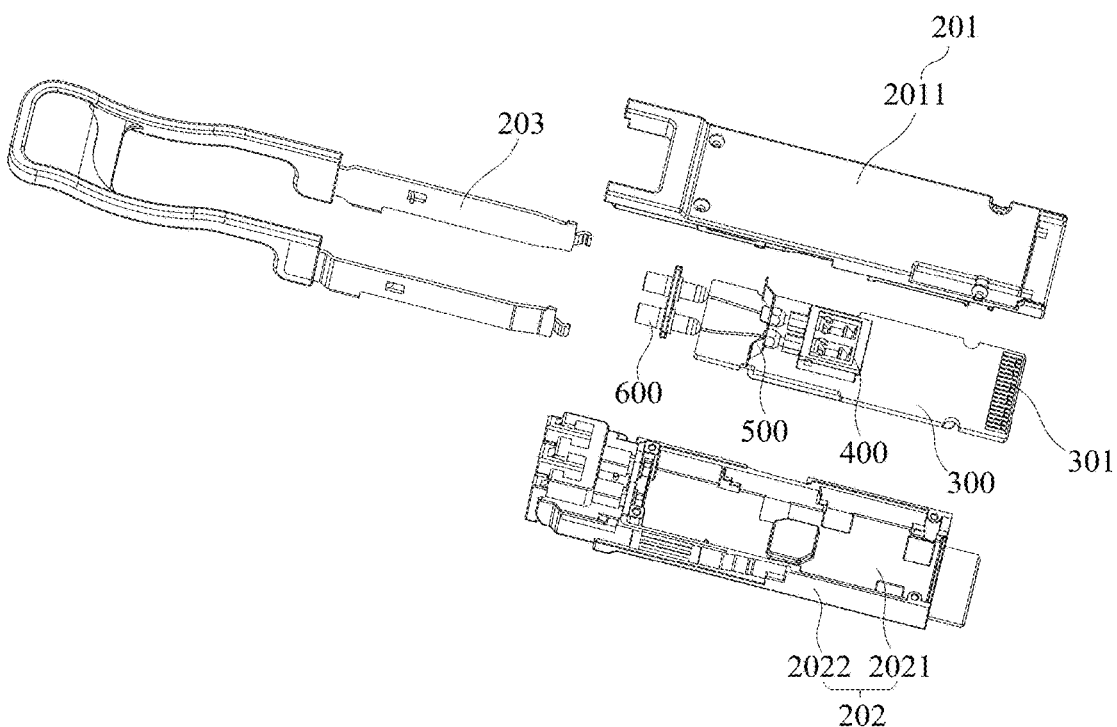
FIG. 4 is an exploded view of an optical module, in accordance with some embodiments.

FIG. 3 is a structural diagram of an optical module in accordance with some embodiments, and FIG. 4 is an exploded view of an optical module in accordance with some embodiments. As shown in FIGS. 3 and 4, the optical module 200 includes a shell, a circuit board 300, a lens assembly 400 and an optical fiber ferrule assembly 600 disposed in the shell.

The shell includes an upper shell 201 and a lower shell 202. The upper shell 201 covers the lower shell 202 to form the above shell with two openings, and an outer contour of the shell is generally in a cuboid shape.

In some embodiments of the present disclosure, the lower shell 202 includes a bottom plate 2021 and two lower side plates 2022 located on two sides of the bottom plate 2021 respectively and disposed perpendicular to the bottom plate 2021; the upper shell 201 includes a cover plate 2011, and the cover plate 2011 covers the two lower side plates 2022 of the lower shell 202 to form the above shell.

In some embodiments, the lower shell 202 includes a bottom plate and two lower side plates located on both sides of the bottom plate respectively and disposed perpendicular to the bottom plate; the upper shell 201 includes a cover plate and two upper side plates located on both sides of the cover plate respectively and disposed perpendicular to the cover plate; and the two upper side plates are combined with the two lower side plates respectively, so that the upper shell 201 covers the lower shell 202.

A direction in which a connecting line between the two openings 204 and 205 is located may be the same as a longitudinal direction of the optical module 200, or may not be the same as the longitudinal direction of the optical module 200. For example, the opening 204 is located at an end (a right end in FIG. 3) of the optical module 200, and the opening 205 is also located at an end (a left end in FIG. 3) of the optical module 200. Alternatively, the opening 205 is located at an end of the optical module 200, and the opening 204 is located on a side of the optical module 200. The opening 204 is the electrical port, and a connecting finger 301 extends from the electrical port 204 and inserts into the master monitor (e.g., the optical network terminal 100); the opening 205 is the optical port, and is configured to assess an external optical fiber 101, so that the optical fiber 101 is connected to the lens assembly 400 inside the optical module 200.

By using an assembly mode of combining the upper shell 201 and the lower shell 202, it is possible to facilitate installation of devices such as the circuit board 300, the lens assembly 400, and the optical fiber ferrule assembly 600 into the shell, and the upper shell 201 and the lower shell 202 may form encapsulation protection for these devices. In addition, when devices such as the circuit board 300 and the lens assembly 400 are assembled, it is possible to facilitate arrangement of positioning components, heat dissipation components and electromagnetic shielding components of these devices, which is conducive to implementation of automated production.

In some embodiments, the upper shell 201 and the lower shell 202 are generally made of a metal material, which facilitates electromagnetic shielding and heat dissipation.

In some embodiments, the optical module 200 further includes an unlocking component 203 located at an outside of the shell. The unlocking component 203 is configured to implement a fixed connection between the optical module 200 and the master monitor, or to release the fixed connection between the optical module 200 and the master monitor.

For example, the unlocking component 203 is located on outer walls of the two lower side plates 2022 of the lower shell 202, has an engagement component that is matched with the cage of the master monitor (e.g., the cage 106 of the optical network terminal 100). When the optical module 200 is inserted into the cage of the master monitor, the optical module 200 is fixed in the cage of the master monitor by the engagement component of the unlocking component 203. When the unlocking component 203 is pulled, the engagement component of the unlocking component 203 moves with the pulling, and then a connection relationship between the engagement component and the master monitor is changed to release engagement between the optical module 200 and the master monitor, so that the optical module 200 may be drawn out of the cage of the master monitor.

The circuit board 300 includes a circuit wiring, electronic elements and chips. Through the circuit wiring, the electronic elements and the chips are connected together according to a circuit design, so as to implement functions such as power supply, transmission of electrical signals and grounding. The electronic elements may include, for example, a capacitor, a resistor, a triode, and a metal-oxide-semiconductor field-effect transistor (MOSFET). The chips may include, for example, a microcontroller unit (MCU), a limiting amplifier, a clock and data recovery (CDR) chip, a power management chip or a digital signal processing (DSP) chip.

The circuit board 300 is generally a rigid circuit board, and the rigid circuit board may also implement a bearing function due to its relatively hard material. For example, the rigid circuit board may stably bear the electronic elements and the chips, and may also be inserted into the electrical connector in the cage of the master monitor.

The circuit board 300 further includes the connecting finger 301 formed on an end surface thereof, and the connecting finger 301 is composed of a plurality of independent pins. The circuit board 300 is inserted into the cage 106, and is conductively connected to the electrical connector in the cage 106 through the connecting finger 301. The connecting finger 301 may be disposed on only a surface (e.g., an upper surface shown in FIG. 4) of the circuit board 300, or may be disposed on both upper and lower surfaces of the circuit board to adapt to an occasion with a demand for a large number of pins. The connecting finger 301 is configured to establish an electrical connection with the master monitor to realize the power supply, the grounding, transmission of I2C signal, and the transmission of electrical signals.

Of course, flexible circuit boards are also used in some optical modules. As a supplement to the rigid circuit board, a flexible circuit board is generally used in conjunction with the rigid circuit board.

Figure 7A:
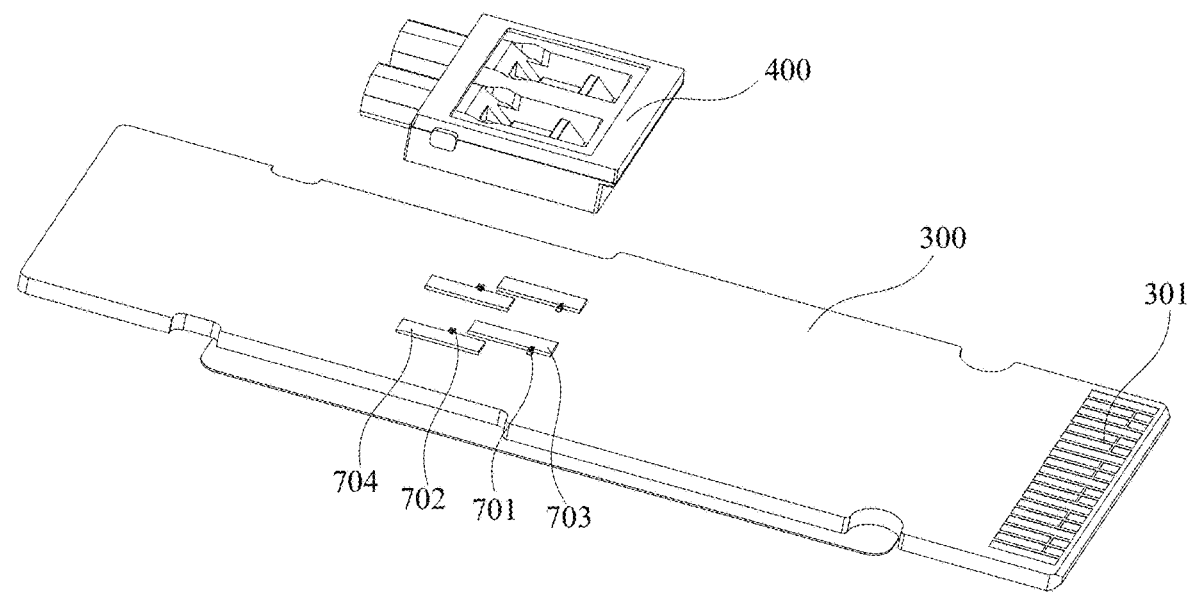
FIG. 7A is an exploded view of a lens assembly, each chip and a circuit board of an optical module, in accordance with some embodiments.

As shown in FIG. 7A, the optical module 200 further includes a light-transmitting chip 701, a driving chip 703, a light-receiving chip 702 and a trans-impedance amplifier chip 704 that are disposed on the circuit board 300. The driving chip 703 is configured to cooperate with the light-transmitting chip 701 to drive the light-transmitting chip 701 to generate an optical signal; the trans-impedance amplifier chip 704 is configured to cooperate with the light-receiving chip 702 to receive the optical signal.

Of course, in some embodiments, the optical module 200 may include only the light-transmitting chip 701 and the driving chip 703, or may include only the light-receiving chip 702 and the trans-impedance amplifier chip 704.

Figure 5:
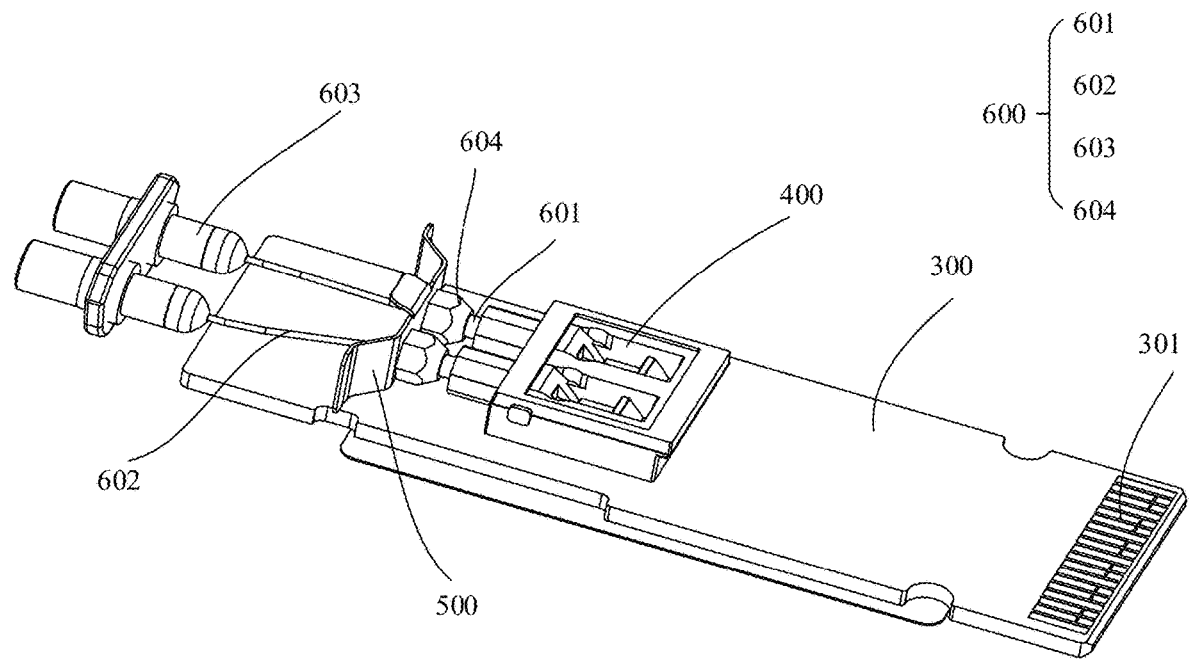
FIG. 5 is a structural diagram of an optical module with an upper shell, a lower shell and an unlocking component which are removed, in accordance with some embodiments.

As shown in FIG. 5, an end of the optical fiber ferrule assembly 600 is connected to the lens assembly 400, and another end thereof is connected to the external optical fiber 101. The optical fiber ferrule assembly 600 is configured to transmit an optical signal. For example, an optical signal emitted from the light-transmitting chip 701 enters the optical fiber ferrule assembly 600 after passing through the lens assembly 400, and is transmitted to the external optical fiber 101 through the optical fiber ferrule assembly 600, thereby outputting the optical signal to an outside of the optical module 200. An optical signal transmitted from the external optical fiber 101 is transmitted into the lens assembly 400 through the optical fiber ferrule assembly 600, and then enters the light-receiving chip 702, thereby receiving the optical signal from the outside of the optical module 200.

In some embodiments, the number of the optical fiber ferrule assembly 600 is two. Each of the two optical fiber ferrule assemblies 600 may transmit an optical signal outwards, and may transmit an optical signal inwards. Alternatively, one of the two optical fiber ferrule assemblies 600 transmits the optical signal outwards and the other thereof transmits the optical signal inwards.

On this basis, as shown in FIG. 5, the number of the lens assembly 400 is also two; and each optical fiber ferrule assembly 600 is connected to a corresponding lens assembly 400. In this case, the two lens assemblies 400 may be separate or integral.

Figure 6:
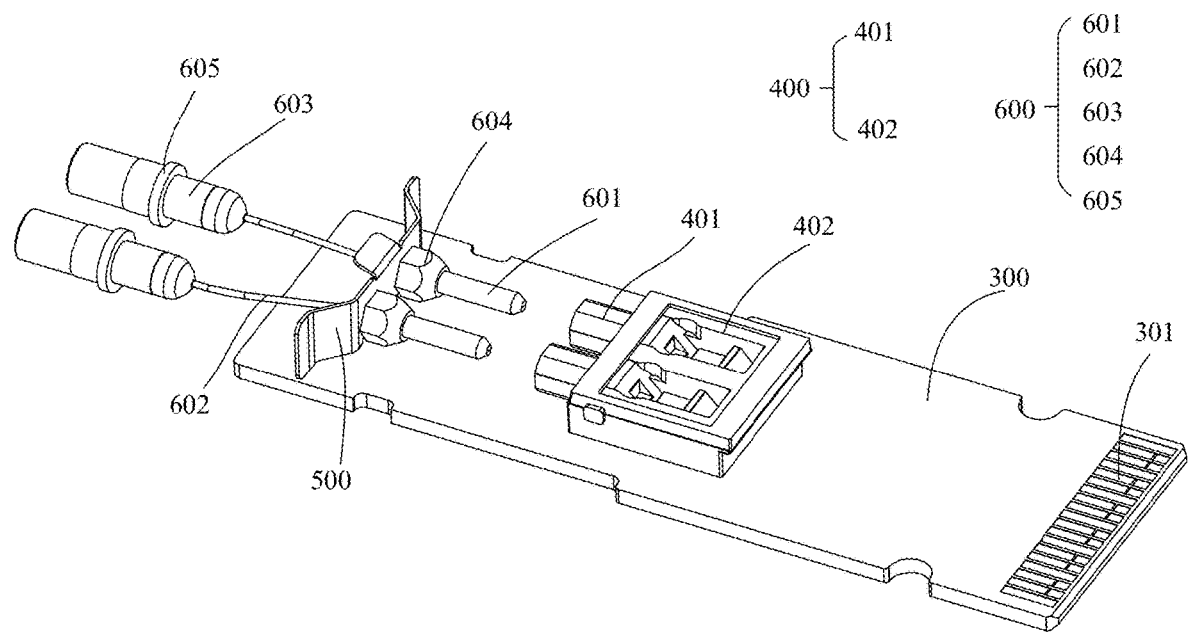
FIG. 6 is a partial exploded view of the components shown in FIG. 5.
Figure 7B:
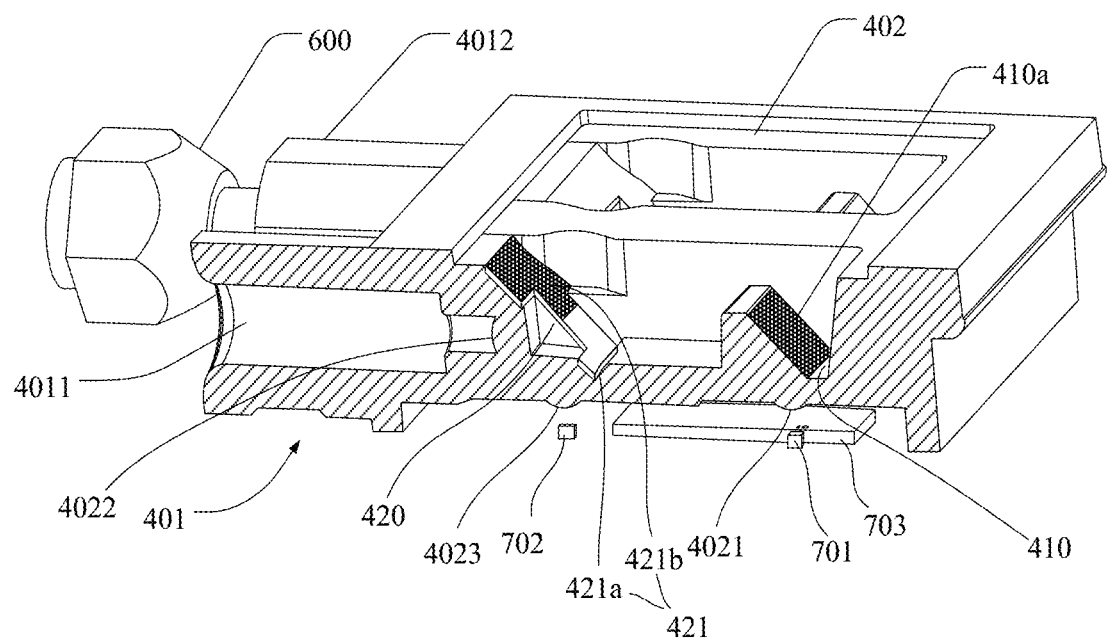
FIG. 7B is a sectional view of each chip and a lens assembly of an optical module, in accordance with some embodiments.
Figure 7C:
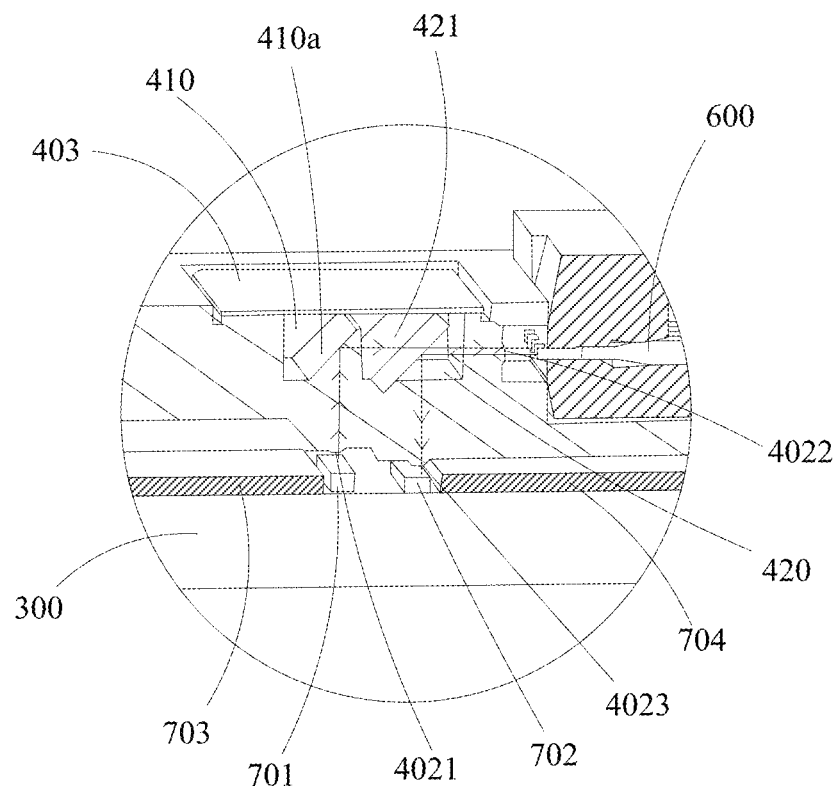
FIG. 7C is an optical path diagram of each chip and a lens assembly of an optical module, in accordance with some embodiments.

As shown in FIGS. 6 to 7C, the lens assembly 400 is disposed on the circuit board 300, and is configured to change a propagation direction of the optical signal. The lens assembly 400 and the circuit board 300 forms an accommodating cavity in which the light-transmitting chip 701, the driving chip 703, the light-receiving chip 702 and the trans-impedance amplifier chip 704 are disposed. The lens assembly 400 covers the light-transmitting chip 701, the driving chip 703, the light-receiving chip 702 and the trans-impedance amplifier chip 704, so that the above chips are covered under the lens assembly 400. The light-transmitting chip 701 and the driving chip 703 are both disposed in the accommodating cavity, which shortens a connection line between the two chips and reduces a signal loss caused by the connection line. Similarly, the light-receiving chip 702 and the trans-impedance amplifier chip 704 are both disposed in the accommodating cavity, which also has the above technical effects.

In some embodiments, the optical module 200 only includes the light-transmitting chip 701 and the driving chip 703. In this case, the light-transmitting chip 701 and the driving chip 703 are disposed in the accommodating cavity, and the lens assembly 400 covers the light-transmitting chip 701 and the driving chip 703.

In some other embodiments, the optical module 200 only includes the light-receiving chip 702 and the trans-impedance amplifier chip 704. In this case, the light-receiving chip 702 and the trans-impedance amplifier chip 704 are disposed in the accommodating cavity, and the lens assembly 400 covers the light-receiving chip 702 and the trans-impedance amplifier chip 704.

The optical signal emitted from the light-transmitting chip 701 enters the lens assembly 400, enters the optical fiber ferrule assembly 600 after being reflected by the lens assembly 400, and is transmitted to the external optical fiber 101 through the optical fiber ferrule assembly 600; and the optical signal from the external optical fiber 101 is transmitted into the lens assembly 400 through the optical fiber ferrule assembly 600, and enters the light-receiving chip 702 after being reflected by the lens assembly 400. That is, the lens assembly 400 not only serves to enclose the light-transmitting chip 701 and the light-receiving chip 702, but also establishes optical connections between the light-transmitting chip 701 and the optical fiber ferrule assembly 600 and between the light-receiving chip 702 and the optical fiber ferrule assembly 600.

As shown in FIG. 6, the lens assembly 400 includes a plugging portion 401 and a lens base 402.

The plugging portion 401 is disposed at an end of the lens base 402, and is configured to allow the optical fiber ferrule assembly 600 to be inserted. The plugging portion 401 has a cavity for accommodating the optical fiber ferrule assembly 600, and an opening disposed at an end of the plugging portion 401 for inserting the optical fiber ferrule assembly 600. The optical fiber ferrule assembly 600 is inserted into the cavity of the plugging portion 401 through the opening, thereby realizing an optical connection between the optical fiber ferrule assembly 600 and the lens base 402, so that the optical signal transmitted from the optical fiber ferrule assembly 600 enters the lens base 402, or the optical signal transmitted from the lens base 402 enters the optical fiber ferrule assembly 600.

As shown is FIG. 7B, the plugging portion 401 further includes an inner surface 4011 and an outer surface 4012. In order to facilitate insertion of the optical fiber ferrule assembly 600 into the plugging portion 401, a shape of an end of the optical fiber ferrule assembly 600 for being inserted into the plugging portion 401 is matched with a shape of the inner surface 4011, and an inner diameter of the inner surface 4011 is greater than an outer diameter of the end of the optical fiber ferrule assembly 600 for being inserted into the plugging portion 401. For example, a cross-sectional shape of the end of the optical fiber ferrule assembly 600 for being inserted into the plugging portion 401 is a circle, and a shape of the inner surface 4011 is also a circle. Of course, the cross-sectional shape of the end of the optical fiber ferrule assembly 600 for being inserted into the plugging portion 401 and the shape of the inner surface may also be an oval, a rectangle or a diamond, which are not limited in the present disclosure.

As shown in FIGS. 7B and 7C, the lens base 402 is configured to change the propagation direction of the optical signal, and includes a first groove 410, a second groove 420 and an optical filter 421. The first groove 410 is disposed on a surface of the lens base 402 away from the circuit board 300 and is recessed toward an inside of the lens base 402. An inclined sidewall of the first groove 410 forms a reflective surface 410a, and the optical signal emitted from the light-transmitting chip 701 enters the lens base 402, and after the optical signal is reflected by the reflective surface 410a, the propagation direction of the optical signal is changed (from a vertical direction to a horizontal direction), and the optical signal, the propagation direction of which is changed, is emitted into the optical fiber ferrule assembly 600.

The second groove 420 is disposed on a surface of the lens base 402 away from the circuit board 300 and is recessed toward the inside of the lens base 402. The second groove 420 is closer to the optical fiber ferrule assembly 600 than the first groove 410. The optical filter 421 is obliquely disposed in the second groove 420, and is configured to reflect the optical signal from the outside of the optical module 200 and transmit the optical signal emitted from the light-transmitting chip 701. For example, the optical filter 421 has a transmissive portion 421a and a reflective portion 421b. The optical signal from the outside of the optical module 200 is transmitted into the lens base 402 through the optical fiber ferrule assembly 600, and after the optical signal is reflected by the reflective portion 421b, the propagation direction of the optical signal is changed (from the horizontal direction to the vertical direction), and the optical signal, the propagation direction of which is changed, is emitted to the light-receiving chip 702. The optical signal emitted from the light-transmitting chip 701 is emitted to the optical filter 421 after being reflected by the reflective surface 410a, and enters the optical fiber ferrule assembly 600 through the transmissive portion 421a. That is, in processes of transmitting an optical signal to the outside and receiving an optical signal from the outside, the optical signals share an optical path from the optical fiber ferrule assembly 600 to the optical filter 421.

In some embodiments, as shown in FIG. 7C, the lens assembly 400 further includes a dust cap 403 covering the first groove 410 and the second groove 420.

In the above structure, the first groove 410 is provided on the surface of the lens base 402 away from the circuit board 300, so that the inclined sidewall thereof forms the reflective surface 410a, which is utilized to reflect the optical signal emitted from the light-transmitting chip 701 into the optical fiber ferrule assembly 600. A manufacturing process of the lens base 402 is simple. In addition, the second groove 420 is provided on the surface of the lens base 402 away from the circuit board 300, and a design of providing the optical filter 421 in the second groove 420 not only skillfully utilizes a light transmitting function of the optical filter 421 to enable the optical signal reflected by the reflective surface 410a to transmit through the optical filter 421, but also skillfully utilizes a reflective function of the optical filter 421 to make the optical signal incident through the optical fiber ferrule assembly 600 to be reflected, and then received by the light-receiving chip 702. This type of optical path is ingenious in structural design, compact in structure, small in occupied space and low in cost.

In some embodiments, the optical module 200 only includes the light-transmitting chip 701 and the driving chip 703. On this basis, the lens base 402 only includes the first groove 410, and does not include the second groove 420 and the optical filter 421. In some other embodiments, the optical module 200 only includes the light-receiving chip 702 and the trans-impedance amplifier chip 704. On this basis, the lens base 402 only includes the second groove 420 and the optical filter 421 disposed in the second groove 420, and does not include the first groove 410.

As shown in FIGS. 7B and 7C, the lens base 402 further includes a first lens 4021, a second lens 4022 and a third lens 4023. The first lens 4021 is disposed on a surface of the lens base 402 proximate to the circuit board 300, and corresponds to a position of the light-transmitting chip 701. The second lens 4022 is disposed on a surface of the lens base 402 facing the optical fiber ferrule assembly 600, and corresponds to a position of the optical fiber ferrule assembly 600. The third lens 4023 is disposed on the surface of the lens base 402 proximate to the circuit board 300, and corresponds to a position of the light-receiving chip 702.

In a process where the optical module 200 transmits the optical signal to the outside, information-carrying light emitted by the light-transmitting chip 701 is emitted to the reflective surface 410a after being converted into parallel light through the first lens 4021; and the parallel light is emitted to the second lens 4022 through the transmissive portion 421*a* of the optical filter 421 after being reflected by the reflective surface 410*a*, and then enters the optical fiber ferrule assembly 600 after being converged by the second lens 4022 (in this case, the second lens 4022 is used as a focusing lens).

In a process where the optical module 200 receives the optical signal transmitted from the external optical fiber 101, the information-carrying light is transmitted to the second lens 4022 through the optical fiber ferrule assembly 600, and is emitted to the optical filter 421 after being converted into parallel light through the second lens 4022 (in this case, the second lens 4022 is used as a collimating lens); and the parallel light is emitted to the third lens 4023 after being reflected by the reflective portion 421*b* of the optical filter 421, and then enters the light-receiving chip 702 after being converged by the third lens 4023.

Figure 8:
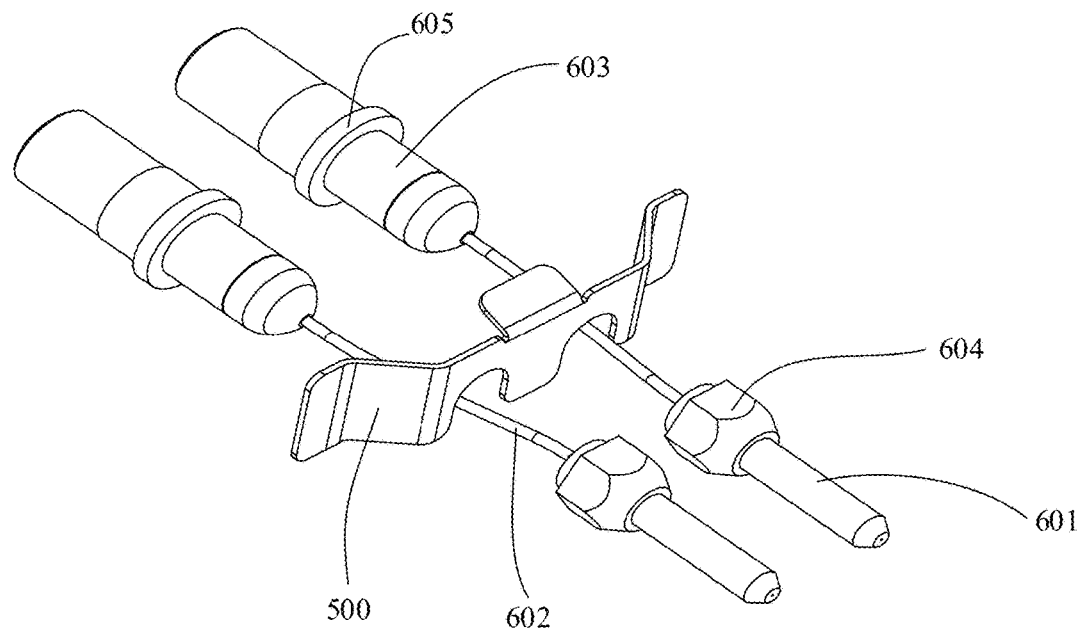
FIG. 8 is an exploded view of the optical fiber ferrule assembly and the fixing plate shown in FIG. 6.

As shown in FIGS. 5, 6, and 8, the optical fiber ferrule assembly 600 includes a first optical fiber ferrule 601, a second optical fiber ferrule, an internal optical fiber 602 and an optical fiber adapter 603. One end of the internal optical fiber 602 is connected to the first optical fiber ferrule 601, and the other end thereof is connected to the second optical fiber ferrule. The first optical fiber ferrule 601 is inserted into the plugging portion 401 of the lens assembly 400, thereby realizing an optical connection between the internal optical fiber 602 and the lens assembly 400. The second optical fiber ferrule is inserted into the optical fiber adapter 603, and a tail end of the external optical fiber 101 is also inserted into the optical fiber adapter 603, thereby realizing docking of the external optical fiber 101 and the internal optical fiber 602. The optical signal from the lens assembly 400 is transmitted into the external optical fiber 101 through the internal optical fiber 602, and the optical signal from the external optical fiber 101 is transmitted into the lens assembly 400 through the internal optical fiber 602.

The first optical fiber ferrule 601 has an optical fiber hole extending through opposite end faces of the first optical fiber ferrule 601. The internal optical fiber 602 passes through the optical fiber hole such that the internal optical fiber 602 is wrapped by the first optical fiber ferrule 601. In some embodiments, the first optical fiber ferrule 601 is made of a ceramic material. In order to facilitate the passage of the internal optical fiber 602 through the first optical fiber ferrule 601, an inner diameter of the first optical fiber ferrule 601 (a diameter of the optical fiber hole) is greater than an outer diameter of the internal optical fiber 602.

It will be noted that the second optical fiber ferrule has a structure that is the same as the structure of the first optical fiber ferrule 601, which will not be described herein again.

The optical fiber ferrule assembly 600 further includes a sleeve base 604, and the sleeve base 604 has a through hole extending through opposite end faces of the sleeve base 604. The first optical fiber ferrule 601 passes through the through hole, so that the sleeve base 604 is sleeved on an outer circumference of the first optical fiber ferrule 601. An inner diameter of the sleeve base 604 (a diameter of the through hole) is greater than an outer diameter of the first optical fiber ferrule 601, which facilitates the passage of the first optical fiber ferrule 601 through the sleeve base 604. And there is a gap between the sleeve base 604 and the first optical fiber ferrule 601, which is convenient for glue dispensing operation, so that the sleeve base 604 and the first optical fiber ferrule 601 are adhered by glue.

The sleeve base 604 is made of, for example, stainless steel or other alloy materials, and the present disclosure is not limited thereto. An outer periphery of the sleeve base 604 may be in a shape of a hex nut, or may be in other shapes, and the present disclosure is not limited thereto.

The second optical fiber ferrule is inserted into the optical fiber adapter 603, and the optical fiber adapter 603 wraps the second optical fiber ferrule, therefore the optical fiber adapter 603 needs to be set as a hollow structure. A shape of the optical fiber adapter 603 may be a hollow cylinder, a hollow cuboid or a hollow cube, which is not limited in the present disclosure. An inner diameter of the optical fiber adapter 603 is greater than an outer diameter of the second optical fiber ferrule, thereby facilitating insertion of the second optical fiber ferrule into the optical fiber adapter 603.

The optical fiber ferrule assembly 600 further includes a clamping portion 605 disposed outside the optical fiber adapter 603, and the clamping portion 605 is configured to be clamped with the lower shell 202 of the optical module 200, thereby fixing the optical fiber adapter 603 to the lower shell 202. The clamping portion 605 may wrap around an outer circumference of the optical fiber adapter 603, or may wrap around only a part of the outer circumference of the optical fiber adapter 603. When the clamping portion 605 wraps around the outer circumference of the optical fiber adapter 603, a shape of the clamping portion 605 may be set as a ring.

In some embodiments of the present disclosure, the lens assembly 400 is connected to the optical fiber adapter 603 through the first optical fiber ferrule 601, the second optical fiber ferrule and the internal optical fiber 602, so that a problem that the lens assembly 400 cannot be communicatively connected to the external optical fiber 101 when a size of the lens assembly 400 is not consistent with a size of the optical port 205 may be solved; in addition, when the external optical fiber 101 is inserted into the optical fiber adapter 603, the lens assembly 400 is not caused to be shaken, and thus there is no problem that the lens assembly 400 cannot be communicatively connected to the external optical fiber 101 due to the shaking of the lens assembly 400.

Figure 9:
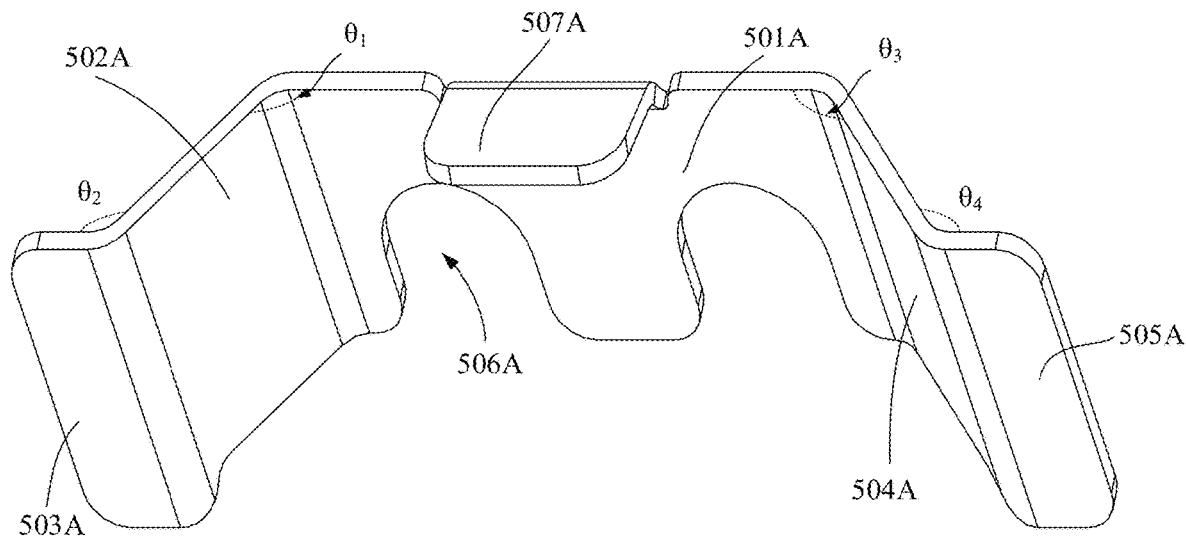
FIG. 9 a structural diagram of a fixing plate of an optical module, in accordance with some embodiments.

As shown in FIGS. 8 and 9, in order to prevent the optical fiber ferrule assembly 600 from slipping off the lens assembly 400, the optical module 200 further includes a fixing plate 500. The fixing plate 500 is located at a side of the sleeve base 604 away from the lens assembly 400 and is clamped with the first optical fiber ferrule 601. A side of the fixing plate 500 abuts against an end face of the sleeve base 604 sleeved on the first optical fiber ferrule 601, and another side abuts against the two opposite lower side plates 2022 of the lower shell 202, so as to abut the first optical fiber ferrule 601 to prevent the first optical fiber ferrule 601 from shaking back and forth (that is, along a longitudinal direction of the plugging portion 401).

The optical module provided by some embodiments of the present disclosure includes the fixing plate 500, and the fixing plate 500 is used to realize the fixing between the optical fiber ferrule assembly 600 and the lens assembly 400. Compared with some practices, in which the sleeve base 604 is glued to the circuit board 300 after the first optical fiber ferrule 601 is inserted into the plugging portion 401, so as to realize a fixed connection between the optical fiber ferrule assembly 600 and the lens assembly 400, the manner of using the fixing plate 500 avoids various inconveniences in the glue dispensing operation, simplifies an assembly process; and in addition, no squeegee operation is required during disassembly, thus avoiding a possibility of damaging the circuit board 300 and the lens assembly 400. In a word, the structural design of the optical module 200 enables the optical fiber ferrule assembly 600 and the lens assembly 400 to be fixedly connected without glue dispensing; the fixing structure is simple and easy to operate, and has low cost in assembly and maintenance.

FIG. 9 is a structural diagram of a fixing plate of an optical module in accordance with some embodiments. As shown in FIG. 9, the fixing plate 500 includes a through hole 506A through which the first optical fiber ferrule 601 is inserted into the plugging portion 401. The fixing plate 500 is clamped with the first optical fiber ferrule 601 through the through hole 506A, and abuts against an end face of the sleeve base 604 away from the lens assembly 400.

For example, the through hole 506A may be a non-fully enclosed through hole with an open lower end. When the fixing plate 500 is clamped with the first optical fiber ferrule 601, the clamping may be smoothly performed through the non-fully enclosed through hole 506A.

After inserting the first optical fiber ferrule 601 into the plugging portion 401 of the lens assembly 400, the fixing plate 500 is placed on a side of the sleeve base 604 away from the lens assembly 400, and the fixing plate 500 is clamped on the outer circumference of the first optical fiber ferrule 601 from top to bottom through the through hole 506A, so that a side of the fixing plate 500 abuts the end face of the sleeve base 604; finally, edges of another side of the fixing plate 500 are abutted against the two opposite lower side plates 2022 of the lower shell 202. In this way, when the first optical fiber ferrule 601 receives an external force in the longitudinal direction of the plugging portion 401 and away from the plugging portion 401, the external force acts on the fixing plate 500, and the fixing plate 500 generates a reaction force, and the reaction force acts on the sleeve base 604 and offsets the external force received by the first optical fiber ferrule 601, so that the first optical fiber ferrule 601 remains stationary, and a fixation of the first optical fiber ferrule 601 is realized.

In order to fix the first optical fiber ferrule 601 through the fixing plate 500, the fixing plate 500 may be opened substantially in a π-shape, and the fixing plate 500 is an elastic plate. The fixing plate 500 includes a main body portion 501A, a first side plate 502A, a second side plate 503A, a third side plate 504A, and a fourth side plate 505A. The main body portion 501A abuts against an end face of the sleeve base 604 and the through hole 506A is disposed on the main body portion 501A.

It will be noted that, in a case where there are two optical fiber ferrule assemblies 600, the fixing plate 500 includes two through holes 506A, and the two through holes 506A are disposed on the main body portion 501A. The first optical fiber ferrule 601 in each optical fiber ferrule assembly 600 passes through a corresponding through hole 506A, and the main body portion 501A is clamped with a corresponding first optical fiber ferrule 601 through the through hole 506A.

The first side plate 502A and the third side plate 504A are respectively connected to two ends of the main body portion 501A, the first side plate 502A and the third side plate 504A are located at a same side of the main body portion 501A, and the first side plate 502A and the third side plate 504A may be symmetrically arranged with respect to the main body portion 501A; the second side plate 503A is connected to the first side plate 502A, the fourth side plate 505A is connected to the third side plate 504A, the second side plate 503A and the fourth side plate 505A are located at a same side of the main body portion 501A, and the second side plate 503A and the fourth side plate 505A may be symmetrically arranged with respect to the main body portion 501A.

There is an included angle $\theta_1$ between the first side plate 502A and the main body portion 501A, the included angle $\theta_1$ may be, for example, an obtuse angle. There is an included angle $\theta_2$ between the second side plate 503A and the first side plate 502A, and the included angle $\theta_2$ may be the same as the included angle $\theta_1$ between the first side plate 502A and the main body portion 501A, that is, the second side plate 503A is substantially parallel to the main body portion 501A.

There is an included angle $\theta_3$ between the third side plate 504A and the main body portion 501A, and the included angle $\theta_3$ may be the same as the included angle $\theta_1$ between the first side plate 502A and the main body portion 501A, that is, the third side plate 504A and the first side plate 502A are symmetrical with respect to the main body portion 501A. There is an included angle 84 between the fourth side plate 505A and the third side plate 504A, and the included angle 84 may be the same as the included angle $\theta_3$ between the third side plate 504A and the main body portion 501A, that is, the fourth side plate 505A is substantially parallel to the main body portion 501A.

The first side plate 502A, the second side plate 503A, the third side plate 504A, and the fourth side plate 505A are substantially in the π-shape. In this way, the second side plate 503A and the fourth side plate 505A are separated from the main body portion 501A by a distance. Distances between the main body portion 501A of the fixing plate 500 and the second side plate 503A, the fourth side plate 505A are increased, thereby increasing an elasticity of the fixing plate 500. As a result, the fixing plate 500 is an elastic member which is able to provide a resilient force.

Figure 10:
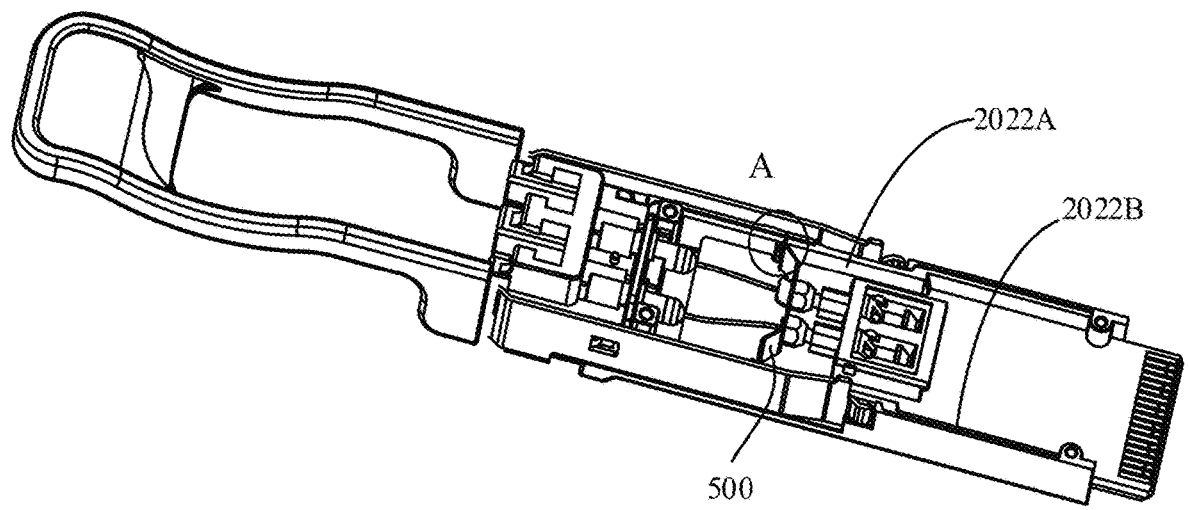
FIG. 10 is a structural diagram of an optical module with an upper shell removed, in accordance with some embodiments.
Figure 11:
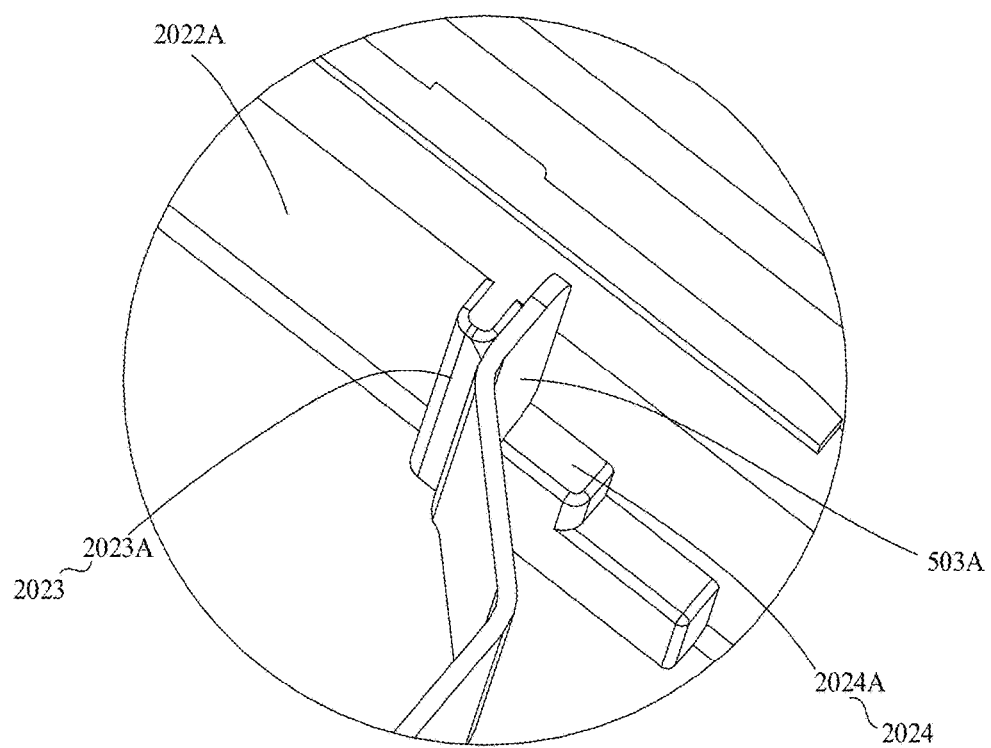
FIG. 11 is an enlarged view of portion A in FIG. 10.

FIG. 10 is a structural diagram of an optical module with an upper shell removed in accordance with some embodiments, and FIG. 11 is an enlarged view of portion A in FIG. 10. As shown in FIGS. 10 and 11, in order to make the fixing plate 500 to abut the two opposite lower side plates 2022 of the lower shell 202, both of the two lower side plates 2022 are provided with a stop boss 2023. The two lower side plates are respectively referred to as a first lower side plate 2022A and a second lower side plate 2022B, a stop boss 2023 provided to the first lower side plate 2022A is referred to as a first stop boss 2023A, and a stop boss 2023 provided to the second lower side plate 20226 is referred to as a second stop boss. The first stop boss 2023A is perpendicular to the first lower plate 2022A and protrudes toward the second lower plate 2022B. The second stop boss is perpendicular to the second lower plate 2022B and protrudes toward the first lower plate 2022A.

For example, as shown in FIG. 11, the first stop boss 2023A is of a U-shaped structure. An end of the first stop boss 2023A is connected to the first lower side plate 2022A, an arc-shaped bottom of the first stop boss 2023A protrudes toward the second lower side plate 2022B, and another end of the first stop boss 2023A is a free end. In addition, the free end is closer to the sleeve base 604 than the end of the first stop boss 2023A which is connected to the first lower side plate 2022A.

Similarly, the second stop boss is of a U-shaped structure. An end of the second stop boss is connected to the second lower side plate 2022B, an arc-shaped bottom of the second stop boss protrudes toward the first lower side plate 2022A, and another end of the second stop boss is a free end. Moreover, the free end is closer to the sleeve base 604 than the end of the second stop boss which is connected to the second lower side plate 2022B. This arrangement may increase an elasticity of the stop boss 2023 and facilitate installation of the fixing plate 500 between the stop boss 2023 and the sleeve base 604.

The fixing plate 500 is disposed between the stop boss 2023 and the sleeve base 604, the main body portion 501A of the fixing plate 500 is clamped with the first optical fiber ferrule 601 through the through hole 506A, and the main body portion 501A abuts against the sleeve base 604. The second side plate 503A of the fixing plate 500 abuts against the first stop boss 2023A, and the fourth side plate 505A abuts against the second stop boss. When the first optical fiber ferrule 601 receives an external force in the longitudinal direction of the plugging portion 401 and away from the plugging portion 401, the external force acts on the main body portion 501A of the fixing plate 500. The fixing plate 500 abuts against the first stop boss 2023A and the second stop boss and has a certain elasticity, the external force acting on the main body portion 501A causes deformation of the fixing plate 500, and the elasticity of the fixing plate 500 enables the fixing plate 500 to generate a reaction force. The reaction force acts on the sleeve base 604 to prevent the first optical fiber ferrule 601 from moving in the longitudinal direction of the plugging portion 401, so as to realize a fixation of the lens assembly 400 and the first optical fiber ferrule 601.

Before the installation of the fixing plate 500 (in which case it is not deformed), a distance between an end face of the second side plate 503A where the second side plate 503A is in contact with the first stop boss 2023A and an end face of the main body portion 501A where the main body portion 501A is in contact with the sleeve base 604 is greater than a distance between an end face of the first stop boss 2023A where the first stop boss 2023A is in contact with the second side plate 503A and the end face of the sleeve base 604 where the sleeve base 604 is in contact with the main body portion 501A. A distance between an end face of the fourth side plate 505A where the fourth side plate 505A is in contact with the second stop boss and the end face of the main body portion 501A where the main body portion 501A is in contact with the sleeve base 604 is greater than a distance between an end face of the second stop boss where the second stop boss is in contact with the fourth side plate 505A and the end face of the sleeve base 604 where the sleeve base 604 is in contact with the main body portion 501A. After the fixing plate 500 is installed between the stop boss 2023 and the sleeve base 604, the sleeve base 604 generates a pressing force on the fixing plate 500, and the first optical fiber ferrule 601 is fixed to the plugging portion 401 of the lens assembly 400 by a resilient force of the fixing plate 500.

In order to increase a stability of the fixing plate 500, the fixing plate 500 further includes a bent tongue 507A disposed on the main body portion 501A, the bent tongue 507A is perpendicular to the main body portion 501A, and the bent tongue 507A and the first side plate 502A are located at a same side of the main body portion 501A. The upper shell 201 of the optical module 200 includes a slot 2012 that matches the bent tongue 507A, and the bent tongue 507A is clamped with the slot 2012 of the upper shell 201, so that the fixing plate 500 may be prevented from falling off.

Figure 12:
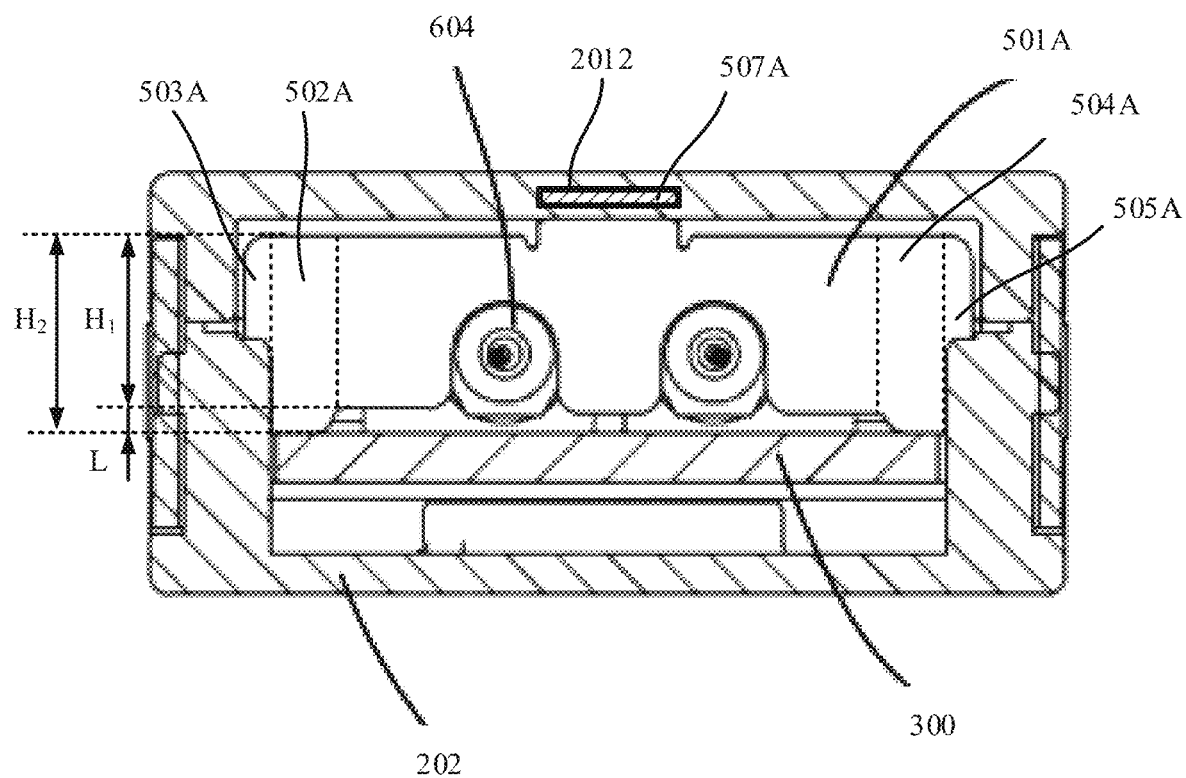
FIG. 12 is a lateral sectional view of a fixing plate in an optical module, in accordance with some embodiments.

FIG. 12 is a lateral sectional view of the fixing plate in an optical module in accordance with some embodiments. As shown in FIG. 12, a circuit wiring is provided on the circuit board 300, in order not to affect arrangement of the circuit wiring, a height $H_1$ of the main body portion 501A of the fixing plate 500 may be smaller than a height $H_2$ of the first side plate 502A and the third side plate 504A. Surfaces of the first side plate 502A and the third side plate 504A proximate to the circuit board 300 are in contact with the circuit board 300, and a gap L is provided between a surface of the main body portion 501A proximate to the circuit board 300 and the circuit board 300. In this way, the circuit wiring on the circuit board 300 may be disposed through the gap L without changing arrangement of the circuit wiring.

However, it is not limited thereto. In order not to affect the arrangement of the circuit wiring on the circuit board 300, in some embodiments, the two opposite lower side plates 2022 of the lower shell 202 each include a supporting boss 2024. A support boss 2024 of the first lower plate 2022A is referred to as a first support boss 2024A, and a support boss 2024 of the second lower plate 2022B is referred to as a second support boss. The first support boss 2024A protrudes toward the second lower side plate 2022B, and a height of the first support boss 2024A is smaller than a height of the first stop boss 2023A, that is, a distance between a surface of the first support boss 2024A away from the circuit board 300 and the circuit board 300 is smaller than a distance between a surface of the first stop boss 2023A away from the circuit board 300 and the circuit board 300.

The second support boss protrudes toward the first lower side board 2022A, and a height of the second support boss is smaller than a height of the second stop boss, that is, a distance between a surface of the second support boss away from the surface of the circuit board 300 and the circuit board 300 is smaller than a distance between a surface of the second stop boss away from the circuit board 300 and the circuit board 300.

When fixing the fixing plate 500, the second side plate 503A is placed on the first support boss 2024A, and the fourth side plate 505A is placed on the second support boss, so that there is a gap between an entire surface of the fixing plate 500 proximate to the circuit board 300 and the circuit board 300. In this way, the circuit wiring on the circuit board 300 may be disposed through the gap without changing the arrangement of the circuit wiring.

In addition to the gap between the main body portion 501A of the fixing plate 500 and the circuit board 300, or the gap between the entire fixing plate 500 and the circuit board 300, there are gaps between the main body portion 501A and the circuit board 300, between the first side plate 502A and the circuit board 300, and between the third side plate 504A and the circuit board 300. That is, heights of the main body portion 501A, the first side plate 502A, and the third side plate 504A of the fixing plate 500 are smaller than heights of the second side plate 503A and the fourth side plate 505A of the fixing plate 500. The second side plate 503A and the fourth side plate 505A are in contact with the circuit board 300, so that the main body portion 501A, the first side plate 502A and the third side plate 504A are suspended, which avoids affecting the circuit wiring on the circuit board 300.

Figure 13:
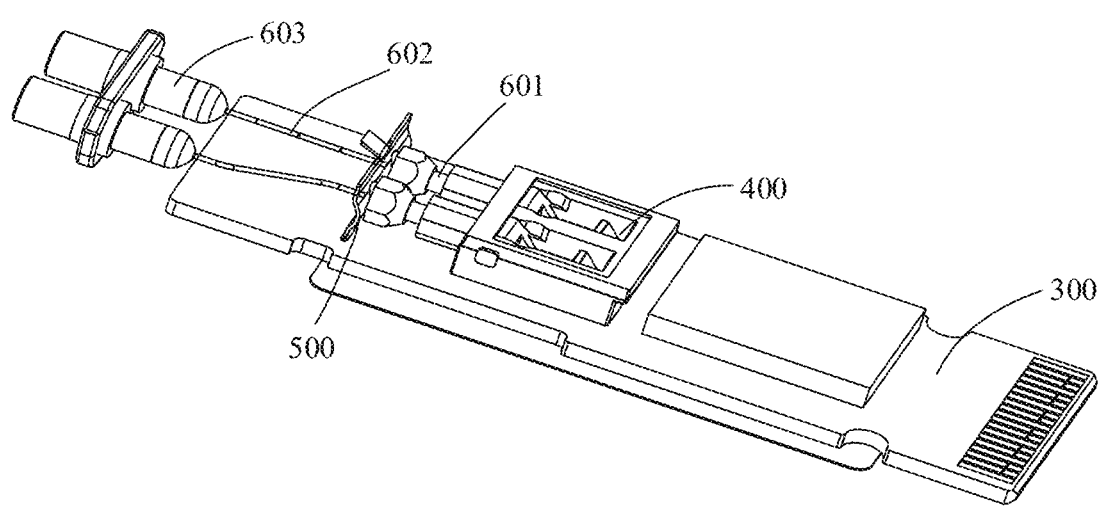
FIG. 13 is a structural diagram of another optical module with an upper shell, a lower shell and an unlocking component which are removed, in accordance with some embodiments.
Figure 14:
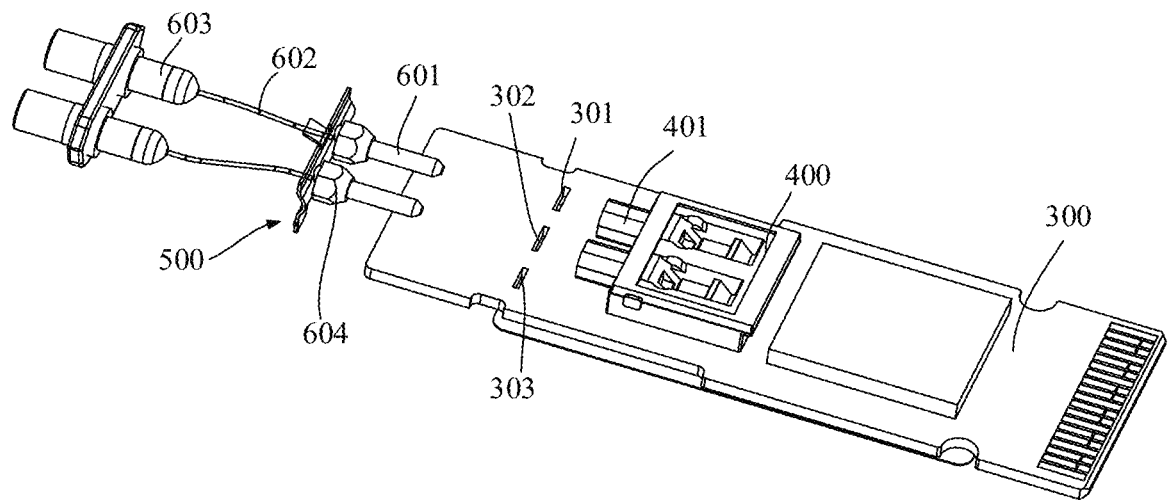
FIG. 14 is a partial exploded view of the components shown in FIG. 13.
Figure 15:
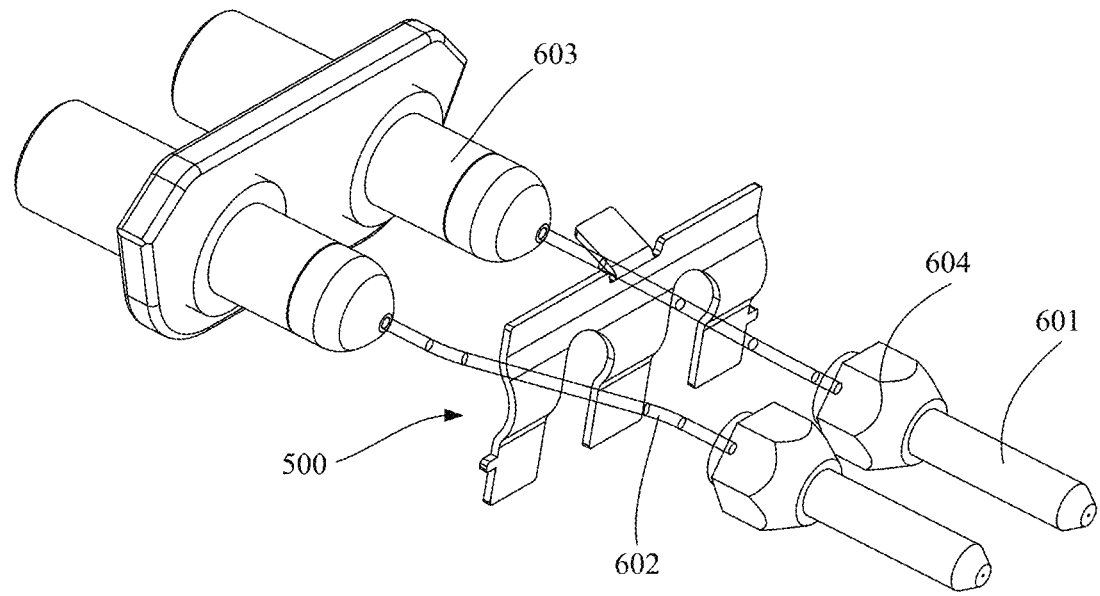
FIG. 15 is an exploded view between the optical fiber ferrule assembly and the fixing plate shown in FIG. 14.

In some embodiments, the fixing plate 500 is not limited to the structure in the FIG. 9. FIG. 13 is a structural diagram of another fixing plate assembled with the optical fiber ferrule assembly, the lens assembly and the circuit board in accordance with some embodiments, FIG. 14 is an exploded view of the components shown in FIG. 13, and FIG. 15 is an exploded view between the optical fiber ferrule assembly and the fixing plate shown in FIG. 14. As shown in FIGS. 13 to 15, the fixing plate 500 is vertically clamped on the circuit board 300, and a side of the fixing plate 500 abuts against the end face of the sleeve base 604 sleeved on the first optical fiber ferrule 601, so as to resist the sleeve base 604 and prevent the first optical fiber ferrule 601 from slipping from the plugging portion 401.

Figure 16:
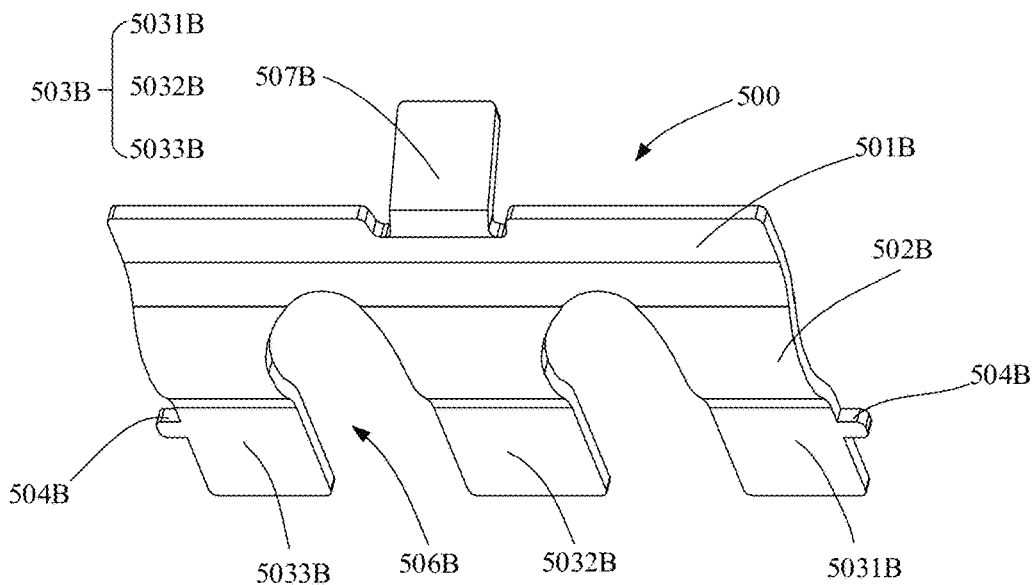
FIG. 16 is another structural diagram of a fixing plate of an optical module, in accordance with some embodiments.
Figure 17:
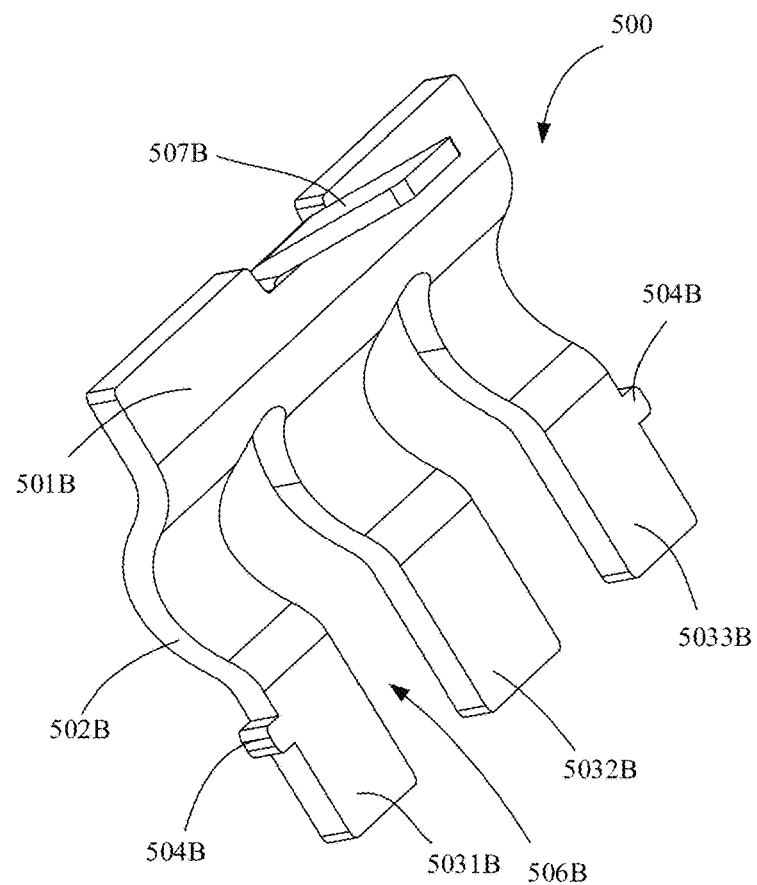
FIG. 17 is a diagram showing a structure of the fixing plate shown in FIG. 16 at another angle.

FIG. 16 is a structural diagram of another fixing plate in accordance with some embodiments, and FIG. 17 is a diagram showing a structure of the fixing plate shown in FIG. 16 at another angle. As shown in FIGS. 16 and 17, the fixing plate 500 includes a through hole 506B. After the first optical fiber ferrule 601 passes through the through hole 506B and is inserted into the plugging portion 401 of the lens assembly 400, the fixing plate 500 is clamped on the outer circumference of the first optical fiber ferrule 601 through the through hole 506B, and abuts against the end face of the sleeve base 604 away from the lens assembly 400.

For example, the through hole 506B may be a non-fully enclosed through hole with an open lower end. When the fixing plate 500 is clamped with the first optical fiber ferrule 601, the clamping may be smoothly performed through the non-fully enclosed through hole 506B.

The fixing board 500 further includes a main board 501B, a protruding portion 502B, and a clamping portion 503B. An end of the protruding portion 502B is connected to the main board 501B, and another end of the protruding portion 502B is connected to the clamping portion 503B. The protruding portion 502B has an arc-shaped structure and is bent toward the sleeve base 604 to abut against the end face of the sleeve base 604 away from the lens assembly 400, and the clamping portion 503B is clamped with the circuit board 300. The through hole 506B is disposed on the protruding portion 502B and the clamping portion 503B, and penetrates the clamping portion 503B.

It will be noted that, in a case where there are two optical fiber ferrule assemblies 600, the fixing plate 500 includes two through holes 506B, and the two through holes 506B are disposed on the protruding portion 502B and the clamping portion 503B, and penetrate the clamping portion 503B. The first optical fiber ferrules 601 in each optical fiber ferrule assembly 600 pass through a corresponding through hole 506B, respectively, and the fixing plate 500 is clamped with corresponding first optical fiber ferrules 601 through the two through holes 506B.

Since the through hole 506B penetrates the clamping portion 503B, the clamping portion 503B includes a plurality of legs, the circuit board 300 includes a plurality of jacks in a one-to-one correspondence with the plurality of legs, and each leg is inserted into a corresponding jack on the circuit board 300, so that the fixing board 500 is fixed on the circuit board 300.

In some embodiments of the present disclosure, the clamping portion 503B includes three legs, which are a first leg 5031B, a second leg 5032B, and a third leg 5033B, the circuit board 300 includes a first jack 301, a second jack 302, and a third jack 303 corresponding to the first leg 5031B, the second leg 5032B, and the third leg 5033B, respectively. When fixing the fixing plate 500, the first leg 5031B is inserted into the first jack 301, the second leg 5032B is inserted into the second jack 302, and the third leg 5033B is inserted into the third jack 303, so that the fixing board 500 is fixed on the circuit board 300.

The fixing plate 500 further includes at least one limiting protrusion disposed on the clamping portion 503B. The present disclosure does not limit the number of the limiting protrusion, and it may be one, two or more.

In some embodiments, as shown in FIG. 16, the fixing plate 500 includes two limiting protrusions 504B, and the two limiting protrusions 504B are respectively disposed on a side of the first leg 5031B and on a side of the third leg 5033B. There is a certain distance between the limiting protrusion 504B and an end of the clamping portion 503B away from the protruding portion 502B, in a case where the first leg 5031B is inserted into the first jack 301, the second leg 5032B is inserted into the second jack 302, and the third leg 5033B is inserted into the third jack 303, the limiting protrusion 504B abuts against the surface of the circuit board 300 proximate to the first optical fiber ferrule 601, so that the fixing plate 500 may not continue to be inserted into the jacks of the circuit board 300, and the legs of the fixing plate 500 are prevented from passing through the circuit board 300 and interfering with other structures of the optical module 200.

Figure 18:
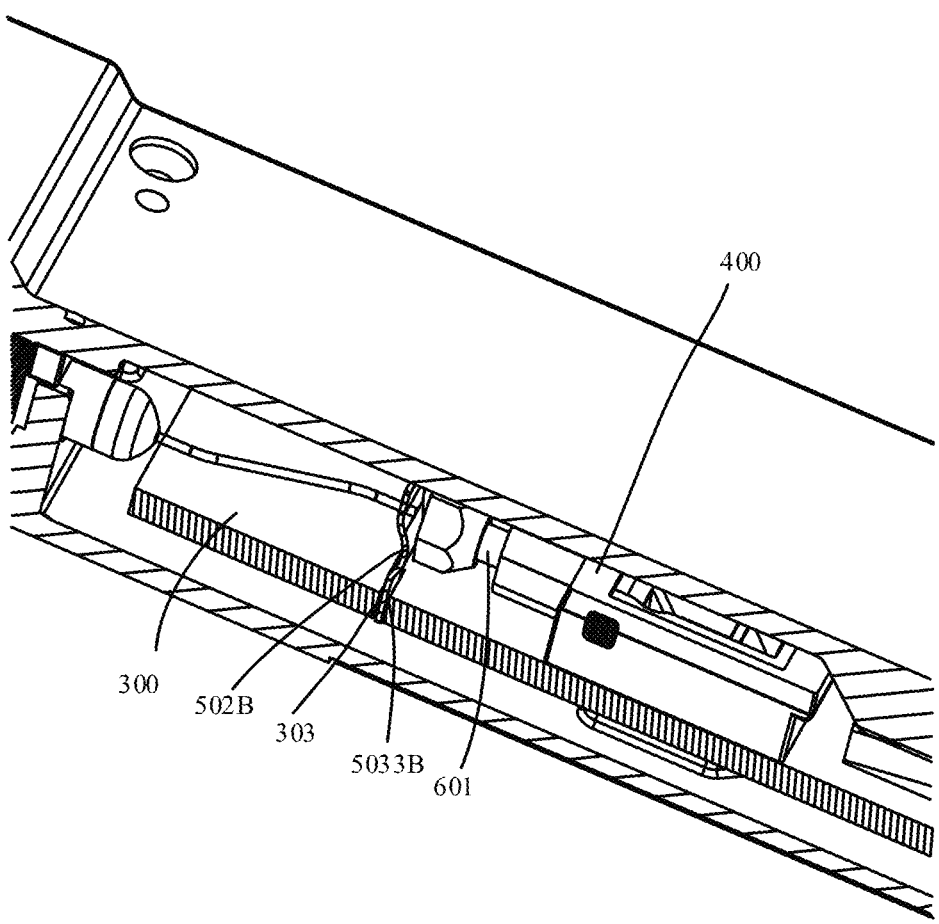
FIG. 18 is a local sectional view of an optical module, in accordance with some embodiments.
Figure 19:
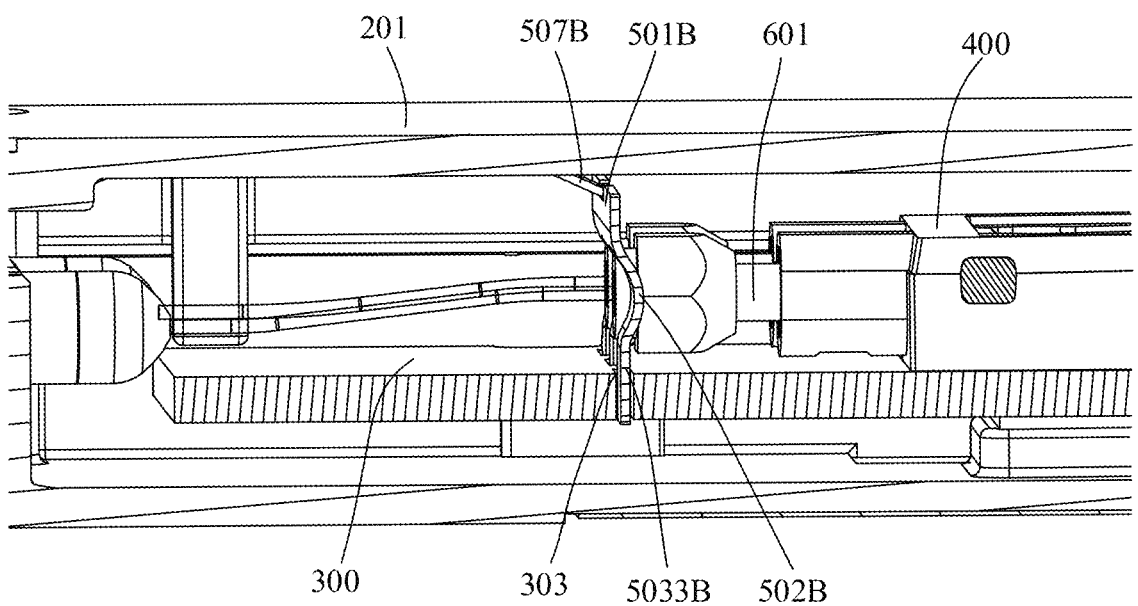
FIG. 19 is a local sectional view of an optical module at another angle, in accordance with some embodiments.

FIG. 18 is a local sectional view of an optical module in accordance with some embodiments, and FIG. 19 is a local sectional view of an optical module at another angle in accordance with some embodiments. As shown in FIGS. 18 and 19, after an end of the first optical fiber ferrule 601 is inserted into the plugging portion 401 of the lens assembly 400, the fixing plate 500 moves downward in a direction perpendicular to the circuit board 300, so that the first leg 5031B is inserted into the first jack 301, the second leg 5032B is inserted into the second jack 302, and the third leg 5033B is inserted into the third jack 303, until the limiting protrusion 504B at the side of the first leg 5031B and the limiting protrusion 504B at the side of the third leg 5033B abut against the surface of the circuit board 300 proximate to the first optical fiber ferrule 601. In this case, the protruding portion 502B of the fixing plate 500 abuts against an end face of the sleeve base 604 sleeved on an outer peripheral side of the first optical fiber ferrule 601, and is used to abut the first optical fiber ferrule 601.

Figure 20:
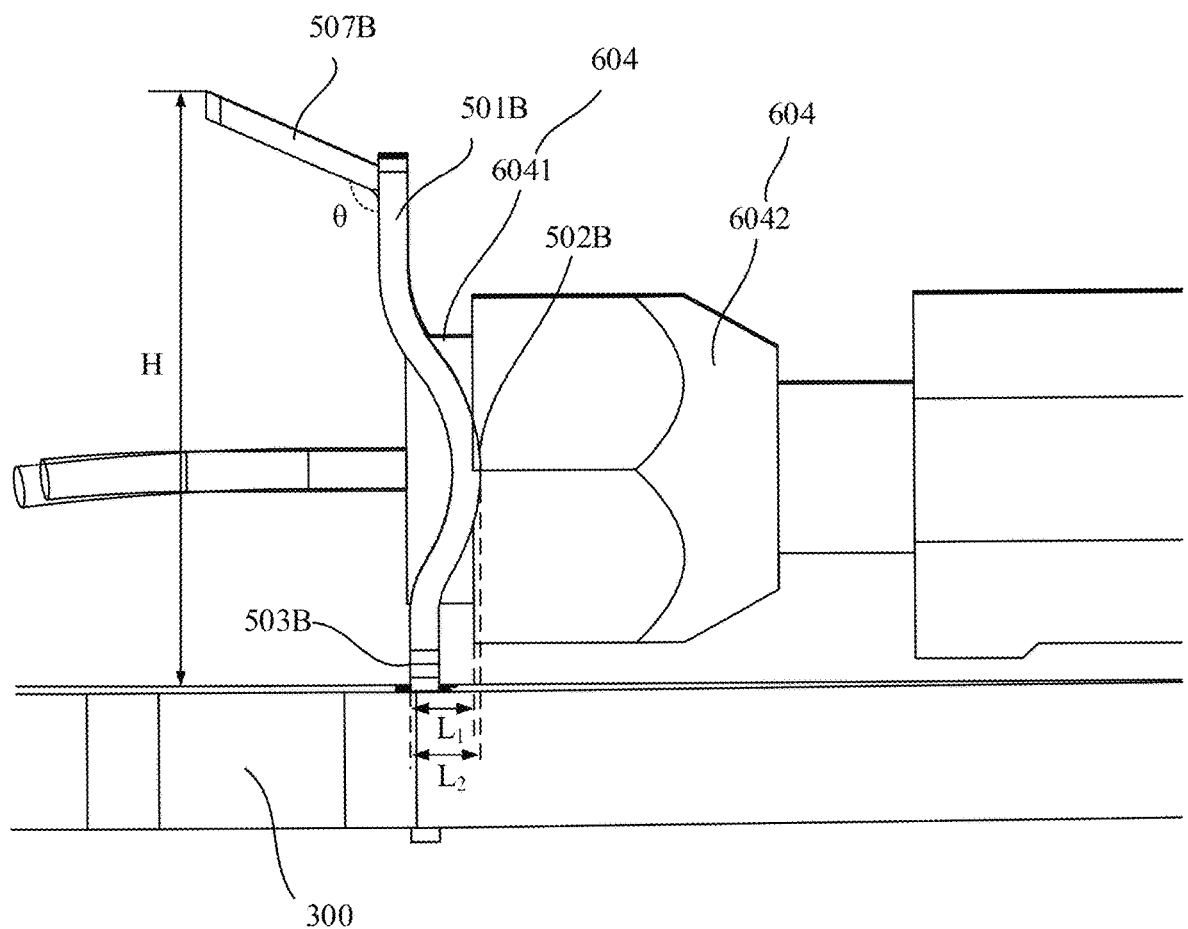
FIG. 20 is a schematic diagram showing an operating state of a fixing plate of an optical module, in accordance with some embodiments.
Figure 21:
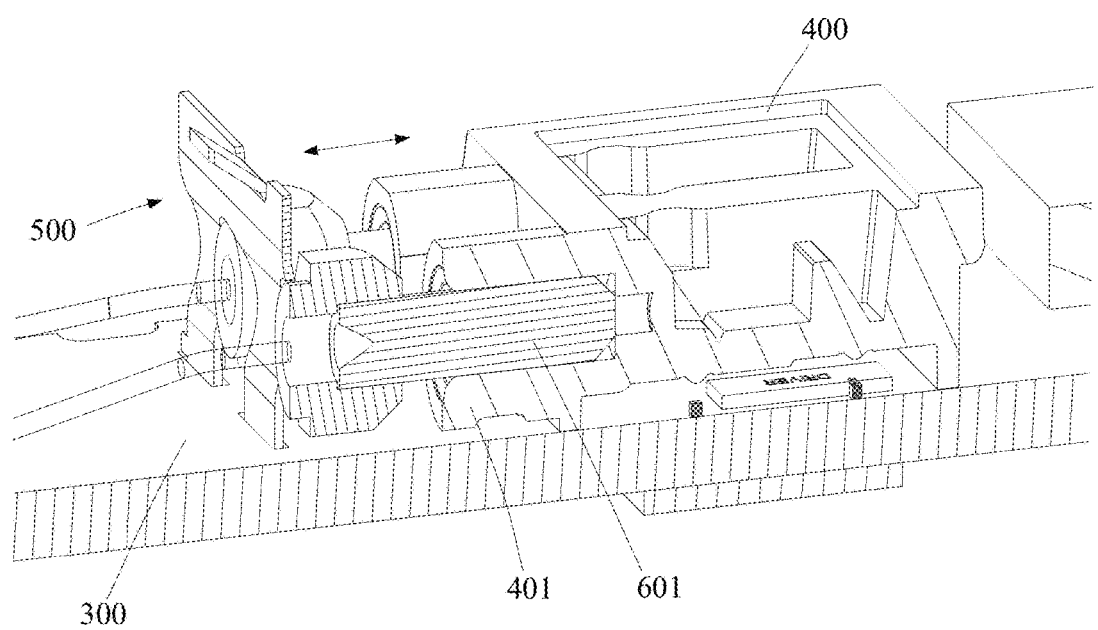
FIG. 21 is a schematic diagram showing an operating effect of a fixing plate of an optical module, in accordance with some embodiments.

FIG. 20 is a schematic diagram showing an operating state of a fixing plate of an optical module in accordance with some embodiments, and FIG. 21 is a schematic diagram showing an operating effect of a fixing plate of an optical module in accordance with some embodiments. As shown in FIGS. 20 and 21, in order to improve the stability of the connection between the first optical fiber ferrule 601 and the plugging portion 401 of the lens assembly 400, a distance $L_1$ between the jacks in the circuit board 300 (e.g., inner walls of the jacks away from the sleeve base 604) and the end face of the sleeve base 604 should be smaller than a height $L_2$ of the protruding portion 502B, so that after the first leg 5031B, the second leg 5032B, and the third leg 5033B are respectively inserted into the corresponding first jack 301, second jack 302 and third jack 303, the end face of the sleeve base 604 generates a pressing force on the protruding portion 502B of the fixing plate 500. Since the fixing plate 500 is an elastic member which provides a resilient force when the protruding portion 502B is deformed, the first optical fiber ferrule 601 and the plugging portion 401 of the lens assembly 400 may be fixed by a resilient force of the protruding portion 502B on the fixing plate 500, so as to prevent the first optical fiber ferrule 601 from moving in the longitudinal direction of the plugging portion 401.

In some embodiments, in a case where an outer side of the first optical fiber ferrule 601 is wrapped with the sleeve base 604, the sleeve base 604 may include a first sleeve 6041 and a second sleeve 6042. An outer diameter of the first sleeve 6041 is smaller than an outer diameter of the second sleeve 6042, that is, an outer surface of the sleeve base 604 is arranged in a stepped shape. The through hole 506B in the fixing plate 500 may be opened to the main board 501B, a portion of the through hole 506B disposed at the main board 501B is in an arc shape. The first sleeve 6041 is inserted into the through hole 506B, the fixing plate 500 is clamped with the first sleeve 6041 through the through hole 506B, and the protruding portion 502B of the fixing plate 500 abuts against an end face of the second sleeve 6042, so that the first optical fiber ferrule 601 may be prevented from moving in the longitudinal direction of the plugging portion 401.

In order not to affect the arrangement of the circuit wiring on the circuit board 300, the circuit wiring may pass through the through holes 506B on the fixing board 500, so there is no need to change the arrangement of the circuit wiring.

In some embodiments, the fixing plate 500 further includes an elastic piece 507B which provides an elastic force when the elastic piece 507B is bent with respect to the main board 501B. The elastic piece 507B is disposed at a side of the main board 501B away from the protruding portion 502B, the elastic piece 507B and the protruding portion 502B are located at different sides of the main board 501B respectively. The elastic piece 507B is inclined upward, that is, an included angle θ between the elastic piece 507B and the main board 501B is the obtuse angle. A height of the elastic piece 507B is H, that is, a maximum distance H between the elastic piece 507B and the circuit board 300 is greater than a distance between a surface of the upper shell 201 proximate to the circuit board 300 and the circuit board 300 when the upper shell 201 is covered on the lower shell 202. When the upper shell 201 is covered in this way, the upper shell 201 generates a pressing force on the elastic piece 507B, so that an end of the elastic piece 507B away from the main board 501B moves downward, that is, the upper shell 201 presses the elastic piece 507B by interference, and the fixing plate 500 is further fixed by the pressing of the upper shell 201.

The foregoing descriptions are merely specific implementations of the present disclosure, but the protection scope of the present disclosure is not limited thereto. Any changes or replacements that a person skilled in the art could readily conceive of within the technical scope of the present disclosure shall be included in the protection scope of the present disclosure. Therefore, the scope of the present disclosure shall be subject to the protection scope of the claims.

What is claimed is:

1. An optical module, comprising:
   a shell;
   a circuit board disposed in the shell;
   at least one of a light-transmitting chip or a light-receiving chip that is disposed on the circuit board, the light-transmitting chip being configured to generate an optical signal, and the light-receiving chip being configured to receive an optical signal from an outside of the optical module;
   a lens assembly disposed on the circuit board, covering the at least one of the light-transmitting chip or the light-receiving chip, and configured to change a propagation direction of an optical signal incident to the lens assembly;
   an optical fiber ferrule assembly connected to the lens assembly, and configured to transmit an optical signal transmitted into the optical fiber ferrule assembly; and
   a fixing plate configured to fix the optical fiber ferrule assembly to the lens assembly; wherein
   the fixing plate includes:
      a main body portion abutting against an end face of the optical fiber ferrule assembly away from the lens assembly;
      a first side plate connected to an end of the main body portion;
      a second side plate connected to the first side plate, and abutting against the shell;
      a third side plate connected to another end of the main body portion;
      a fourth side plate connected to the third side plate, and abutting against the shell; and
      a through hole disposed on the main body portion, and the optical fiber ferrule assembly passing through the through hole; wherein
   the first side plate and the main body portion have a first included angle therebetween, and the second side plate and the first side plate have a second included angle therebetween;
   the third side plate and the main body portion have a third included angle therebetween, and the fourth side plate and the third side plate have a fourth included angle therebetween; and
   the first included angle, the second included angle, the third included angle, and the fourth included angle are all obtuse angles.

2. The optical module according to claim 1, wherein the shell includes a lower shell;
   the lower shell includes a bottom plate and a first lower side plate and a second lower side plate which are connected to the bottom plate and disposed opposite to each other;
   the first lower side plate is provided with a first stop boss, and the first stop boss is perpendicular to the first lower side plate and protrudes toward the second lower side plate;
   the second lower side plate is provided with a second stop boss, and the second stop boss is perpendicular to the second lower side plate and protrudes toward the first lower side plate; and
   the second side plate abuts against the first stop boss, and the fourth side plate abuts against the second stop boss.

3. The optical module according to claim 2, wherein each of the first stop boss and the second stop boss includes a U-shaped structure;
   an end of the U-shaped structure is connected to a corresponding lower side plate, and an arc-shaped bottom of the U-shaped structure protrudes toward another corresponding lower side plate, and another end of the U-shaped structure is a free end; and
   the free end is closer to the fixing plate than the end of the U-shaped structure which is connected to the corresponding lower side plate.

4. The optical module according to claim 2, wherein a distance between a surface of the first stop boss where first stop boss is in contact with the second side plate and a surface of the optical fiber ferrule assembly where the optical fiber ferrule assembly is in contact with the main body portion is smaller than a distance between a surface of the second side plate where the second side plate is in contact with the first stop boss and a surface of the main body portion where the main body portion is in contact with the optical fiber ferrule assembly; and
   a distance between a surface of the second stop boss where the second stop boss is in contact with the fourth side plate and the surface of the optical fiber ferrule assembly where the optical fiber ferrule assembly is in contact with the main body portion is smaller than a distance between a surface of the fourth side plate where fourth side plate is in contact with the second stop boss and the surface of the main body portion where the main body portion is in contact with the optical fiber ferrule assembly.

5. The optical module according to claim 2, wherein the first lower side plate is further provided with a first support boss, and a distance between a surface of the first support boss away from the bottom plate and a surface of the bottom plate proximate to the circuit board is smaller than a distance between a surface of the first stop boss away from the bottom plate and the surface of the bottom plate proximate to the circuit board; and the second lower side plate is further provided with a second support boss, a distance between a surface of the second support boss away from the bottom plate and the surface of the bottom plate proximate to the circuit board is smaller than a distance between a surface of the second stop boss away from the bottom plate and the surface of the bottom plate proximate to the circuit board; and the second side plate is disposed on the first support boss, and the fourth side plate is disposed on the second support boss, so that the fixing plate and the circuit board have a gap therebetween.

6. The optical module according to claim 1, wherein the first side plate and the third side plate are located at a same side of the main body portion, and the first included angle is substantially equal to the third included angle, so that the first side plate and the third side plate are symmetrically arranged with respect to the main body portion.

7. The optical module according to claim 6, wherein the second side plate and the fourth side plate are located at the same side of the main body portion, and the second side plate is substantially equal to the fourth side plate, so that the second side plate and the fourth side plate are symmetrically arranged with respect to the main body portion.

8. The optical module according to claim 1, wherein
the first included angle is substantially equal to the second included angle, so that the second side plate is substantially parallel to the main body portion; and
the third included angle is substantially equal to the fourth included angle, so that the fourth side plate is substantially parallel to the main body portion.

9. The optical module according to claim 2, wherein the shell further includes an upper shell, and the upper shell covers the lower shell; and
the fixing plate further includes a bent tongue disposed on the main body portion, and the bent tongue is configured to clamp with the upper shell.

10. The optical module according to claim 1, wherein there is a gap between a surface of the main body portion proximate to the circuit board and the circuit board, and surfaces of the first side plate and the third side plate proximate to the circuit board are in contact with the circuit board.

11. The optical module according to claim 1, wherein the lens assembly includes:
a lens base configured to change the propagation direction of the optical signal incident into the lens base; and
a plugging portion disposed at an end of the lens base;
the optical fiber ferrule assembly includes:
a first optical fiber ferrule being inserted into the plugging portion;
a sleeve base sleeved on an outer circumference of the first optical fiber ferrule;
an optical fiber adapter;
a second optical fiber ferrule being inserted into the optical fiber adapter; and
an internal optical fiber, an end of the internal optical fiber being connected to the first optical fiber ferrule, and another end of the internal optical fiber being connected to the second optical fiber ferrule.

12. The optical module according to claim 1, wherein the fixing plate is an elastic member.

* * * * *